United States Patent
Ye et al.

(10) Patent No.: US 9,715,313 B2
(45) Date of Patent: Jul. 25, 2017

(54) TOUCH INPUT DEVICE AND TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Benyin Ye, Beijing (CN); Benlian Wang, Beijing (CN); Youqiang Lu, Beijing (CN); Quanguo Zhou, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/122,623

(22) PCT Filed: Jul. 17, 2015

(86) PCT No.: PCT/CN2015/084327
§ 371 (c)(1),
(2) Date: Aug. 30, 2016

(87) PCT Pub. No.: WO2016/173123
PCT Pub. Date: Nov. 3, 2016

(65) Prior Publication Data
US 2017/0075491 A1    Mar. 16, 2017

(30) Foreign Application Priority Data
Apr. 30, 2015    (CN) .......................... 2015 1 0215793

(51) Int. Cl.
G06F 3/044    (2006.01)
G06F 3/041    (2006.01)

(52) U.S. Cl.
CPC ............ G06F 3/0418 (2013.01); G06F 3/044 (2013.01); G06F 3/0412 (2013.01)

(58) Field of Classification Search
CPC ...................................................... G06F 3/044
(Continued)

(56) References Cited

U.S. PATENT DOCUMENTS 9,354,755 B2 * 5/2016 Den Boer ............. G06F 3/0412
9,477,111 B2 * 10/2016 Kim ..................... G02F 1/13338
(Continued)

FOREIGN PATENT DOCUMENTS

CN    103246422 A    8/2013
CN    103941936 A    7/2014
(Continued)

OTHER PUBLICATIONS

International Search Report and Written Opinion in PCT/CN2015/084327 dated Jan. 27, 2016, with English translation. 14 pages.
(Continued)

*Primary Examiner* — Michael Pervan
(74) *Attorney, Agent, or Firm* — Blakely Sokoloff Taylor & Zafman LLP

(57) ABSTRACT

The present disclosure discloses a touch input device including a plurality of driving electrodes and a plurality of sensing electrodes that are formed on a first surface of a substrate. An improved touch input device (with e.g. reduced area occupied by electrodes or improved touch control resolution, and/or decreased number of driving electrode leads) is provided by 1) divisionally using the sensing electrode in a horizontal direction; and optionally 2) further divisionally using the driving electrode in the column direction. One
(Continued)

sensing electrode which is divisionally used in a row direction can be further split into two adjacent sub-sensing electrodes in the row direction. Also disclosed is a touch display device including the touch input device.

19 Claims, 26 Drawing Sheets

(58) Field of Classification Search
USPC .............. 178/18.01–19.07; 345/173–178
See application file for complete search history.

(56) References Cited

U.S. PATENT DOCUMENTS

| | | | | |
|---|---|---|---|---|
| 2012/0319974 A1* | 12/2012 | Kim | ............ | G06F 3/044 345/173 |
| 2014/0076706 A1* | 3/2014 | Hsueh | ............ | G06F 3/044 200/600 |
| 2014/0267137 A1 | 9/2014 | Solven et al. | | |
| 2016/0183382 A1* | 6/2016 | Solven | ............ | G06F 3/044 345/174 |
| 2016/0188034 A1* | 6/2016 | Bayramoglu | ......... | G06F 3/0416 345/174 |
| 2016/0216795 A1* | 7/2016 | Cheung | ............ | G06F 3/044 |
| 2016/0266710 A1* | 9/2016 | Bytheway | ............ | G06F 3/0416 |

FOREIGN PATENT DOCUMENTS

| | | |
|---|---|---|
| CN | 103970355 A | 8/2014 |
| CN | 103995632 A | 8/2014 |
| CN | 203858615 U | 10/2014 |
| JP | 2013152680 A | 8/2013 |

OTHER PUBLICATIONS

Office Action in Chinese Application No. 201510215793.3 dated Apr. 20, 2017, with English translation. 12 pages.

\* cited by examiner

TOUCH INPUT DEVICE AND TOUCH DISPLAY DEVICE

CROSS REFERENCE TO RELATED APPLICATIONS

The present application is the U.S. national phase entry of PCT/CN2015/084327, with an international filing date of Jul. 17, 2015, which claims the benefit of Chinese Patent Application No. 201510215793.3, filed on Apr. 30, 2015, the entire disclosures of which are incorporated herein by reference.

TECHNICAL FIELD

The present disclosure relates to the field of touch input technologies, and more particularly to a touch input device and a touch display device.

BACKGROUND

A touch panel is an input apparatus through which one moves a cursor or inputs an instruction by means of sliding or clicking operations with a touch object such as a finger. For a capacitive touch panel, capacitance would be changed when a user's finger gets close to the touch panel. The change in the capacitance is detected by the touch panel itself and converted into coordinates, such that movements of the finger are derived and converted into corresponding control commands.

Traditional capacitive touch sensors typically have a two-layered structure (i.e., a layer of driving electrodes Tx and a layer of sensing electrodes Rx), resulting in high cost. Recently, a solution of a touch screen using monolayer sensors has been proposed. The typical structure of the monolayer sensors is as shown in FIG. 1. A plurality of sensing electrodes, a plurality of driving electrodes, a plurality of first connecting lines and a plurality of second connecting lines are included in the same conductive layer. The plurality of sensing electrodes 10, 12 and 14 are connected to respective sensing electrode signal input terminals via the first connecting lines R1, R2 and R3, respectively. The driving electrodes are arranged between adjacent sensing electrodes 10, 12 and 14, and each column of driving electrodes includes a plurality of driving electrodes 20. In this example, each column of driving electrodes includes eight driving electrodes 20, each of which is connected to a respective driving signal input terminal via a respective one of second connecting lines T1, T2, T3 ... T8. Each driving electrode and a portion of a corresponding sensing electrode constitute a capacitor 30, as shown by the dashed box in FIG. 1. When touch occurs in a region corresponding to the capacitor 30, the capacitance would be changed, and then a touch control signal is detected within the region. With each capacitor being a detection point, the number of detection points depends on the number of driving electrodes in each column of driving electrodes.

With the increased size of the display panel and the improved touch control resolution, it is required to not only increase the number of sensing electrodes and driving electrodes in the entire panel region, but also increase the number of sensing electrodes and driving electrodes in a unit area. However, further improvement of the touch control resolution is limited in the existing design. For example, as the number of electrodes increases, more second connecting lines are needed to transmit driving signals thereto, which causes more difficulties in wiring and design of driver chips and results in an oversized flexible print circuit (FPC) that is to be bonded.

Accordingly, there is a need for an improved touch input device and a touch display device using the same.

SUMMARY

It is an object of the present disclosure to provide an improved touch input device and a touch display device using the same.

In a first aspect of the present disclosure, a touch input device is provided comprising at least one first electrode structural unit formed on a first surface of a substrate, the first electrode structural unit comprising a first column of driving electrodes comprising at least one first driving electrode; a sensing electrode extending in a column direction; and a second column of driving electrodes comprising at least one first driving electrode. The first column of driving electrodes, the sensing electrode and the second column of driving electrodes are arranged successively in a row direction. Each of the first driving electrodes is connected to a different driving signal lead, and the sensing electrode is connected to a sensing signal lead. Each of the first driving electrodes and a corresponding portion of the sensing electrode form a capacitor. By divisionally using the sensing electrodes in the row direction, improved touch control resolution is achieved with the same area occupied by electrodes.

According to a second aspect of the present disclosure, a touch input device is provided comprising at least one third electrode structural unit formed on a first surface of a substrate, the third electrode structural unit comprising a third column of driving electrodes comprising at least one third driving electrode; a column of sensing electrodes comprising at least two groups of sensing electrodes, each group comprising at least one sensing electrode; and a fourth column of driving electrodes comprising at least one third driving electrode. The third column of driving electrodes, the one column of sensing electrodes and the fourth column of driving electrodes are arranged successively in a row direction, each of the third driving electrodes is connected to a different driving signal lead, and the same group of sensing electrodes in the at least two groups of sensing electrodes is connected to the same sensing signal lead while different groups of sensing electrodes are connected to different sensing signal leads. A portion of each of the column of sensing electrodes and a portion of a corresponding one of the third column of driving electrodes form a capacitor, another portion of each of the column of sensing electrodes and a portion of a corresponding one of the fourth column of driving electrodes form a capacitor, and the at least two groups of sensing electrodes are such arranged in a column direction that each of the third driving electrodes forms a capacitor with a portion of only one sensing electrode in each group of the at least two groups of sensing electrodes. By divisionally using the driving electrodes in the column direction, the number of driving electrode leads is reduced.

According to a third aspect of the present disclosure, a touch display device is provided which comprises the touch input device according to the first aspect or the second aspect of the present disclosure.

The inventive concept of the present disclosure lies in providing an improved touch input device by 1) divisionally using the sensing electrode in the horizontal direction; and optionally 2) further divisionally using the driving electrode in the column direction. One sensing electrode which is divisionally used in the row direction can be further split into two adjacent sub-sensing electrodes in the row direction.

These and other aspects of the present disclosure would be apparent from and elucidated with reference to the embodiments described below.

DETAILED DESCRIPTION

Embodiments of the present disclosure are described below in detail with reference to the drawings.

Figure 2:
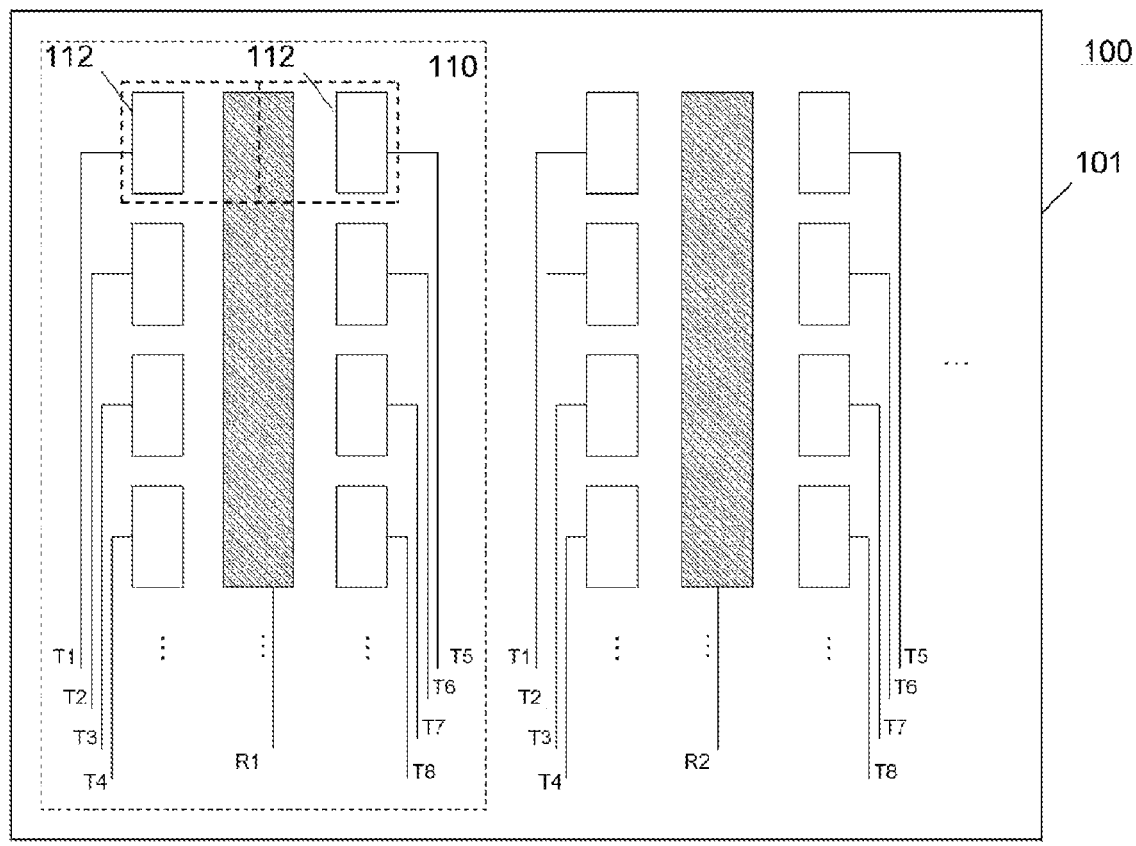
FIG. 2 schematically illustrates a touch input device according to an embodiment of the present disclosure.

FIG. 2 schematically illustrates a touch input device 100 according to an embodiment of the present disclosure. The touch input device 100 comprises at least one electrode structural unit 110 formed in a single layer on a substrate 101. As shown in the figure, the electrode structural unit 110 comprises a first column of driving electrodes on the left side, a second column of driving electrodes on the right side and a sensing electrode between the first column of driving electrodes and the second column of driving electrodes. In other words, the first column of driving electrodes, the sensing electrode and the second column of driving electrodes are arranged successively in a row direction.

In the electrode structural unit 110, the first column of driving electrodes and the second column of driving electrodes each comprise at least one first driving electrode 112, each of which is connected to a respective different driving signal lead T1, T2, T3 . . . T8. The sensing electrode is connected to a sensing signal lead.

As shown in FIG. 2, the sensing electrode is divisionally used in a horizontal direction. Each of the first driving electrodes 112 forms a capacitor with a corresponding portion of the sensing electrode. The first driving electrode 112 and the corresponding portion of the sensing electrode which form the capacitor are adjacent in the row direction. For example, as illustrated by the bold dashed boxes in FIG. 2, the first driving electrode 112 on the left side, the first driving electrode 112 on the right side, and the portions of the sensing electrode therebetween form two capacitors, one of which is formed by the first driving electrode 112 on the left side and the left adjacent portion of the sensing electrode, and the other of which is formed by the first driving electrode 112 on the right side and the right adjacent portion of the sensing electrode.

It is desirable that respective capacitors formed by the sensing electrode and the driving electrodes have substantially equal capacitance to create uniformly distributed touch sensitivity. Due to the manufacture precision, the capacitance of respective capacitors may be different within a certain error range. By way of example, and not limitation, the error may be 5% or other values. As shown in FIG. 2, the capacitance of the two capacitors marked by the dashed boxes may be substantially equal. For example, in the electrode structural unit 110, the corresponding portions of the sensing electrode that form capacitors with respective first driving electrodes 112 in the first column of driving electrodes and the second column of driving electrodes may have substantially equal areas, and the first column of driving electrodes and the second column of driving electrodes may be symmetrical with respect to the sensing electrode column. For instance, as shown in FIG. 2, a segment of the sensing electrode is divided by the bold dashed boxes into left and right portions that have substantially equal areas, and the area of the left (right) portion is also substantially equal to the area of the left (right) portion of a sensing electrode segment corresponding to another first driving electrode 112.

Figure 1:
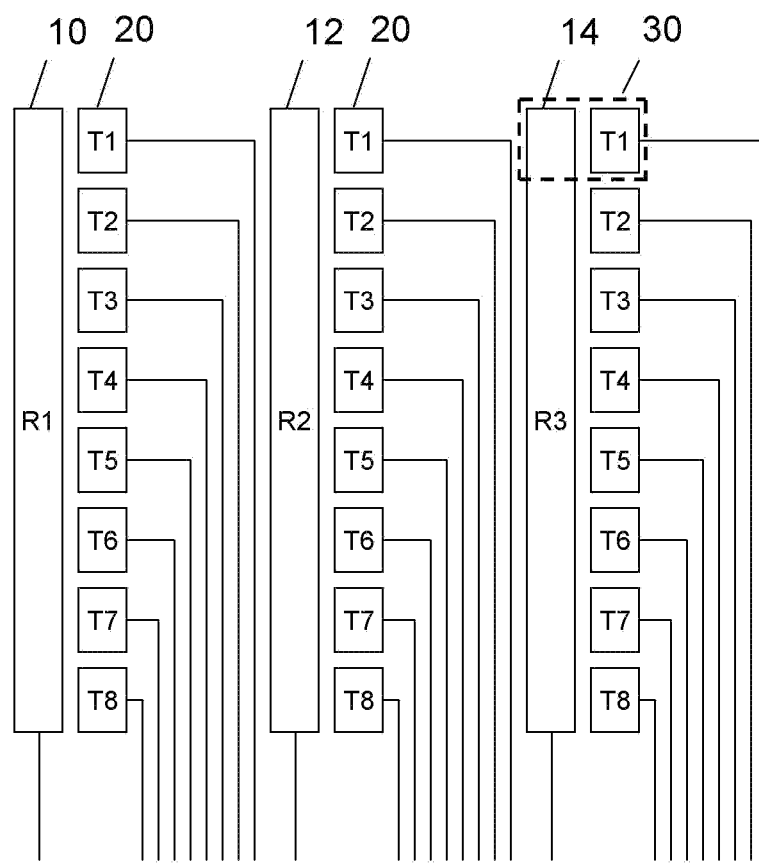
FIG. 1 schematically illustrates an electrode structure in a monolayer capacitive touch screen in the prior art.

In this way, in the touch input device 100 as shown in FIG. 2, the length occupied in the column direction by the electrodes needed for forming sixteen capacitors (detection points) is half the length occupied by those in the prior art touch input device as shown in FIG. 1. Meanwhile, the length occupied in the row direction is just increased slightly. Therefore, the touch input device 100 according to the embodiment can improve the touch control precision, with the same area occupied by electrodes.

It is to be understood that in this embodiment, the so-called "a sensing electrode" can also be regarded as a plurality of discrete sub-sensing electrodes arranged in the column direction, which are electrically connected to the same sensing signal and consequently are equivalent to "one" sensing electrode in terms of function.

At least one electrode structural unit 110 is arranged successively in the row direction to form a touch electrode array of the touch input device 100. As known to those skilled in the art, the driving electrodes located at corresponding positions in respective electrode structural units 110 are connected to the same driving signal. In this example, the driving signals are provided by a driving module via the driving signal leads T1, T2, T3 . . . T8. The sensing electrodes in respective electrode structural units 110 are connected to respective different sensing signals. In this example, the sensing signals are provided by a sensing module via the sensing signal leads R1, R2 . . . corresponding to respective electrode structural units 110.

Figure 3A:
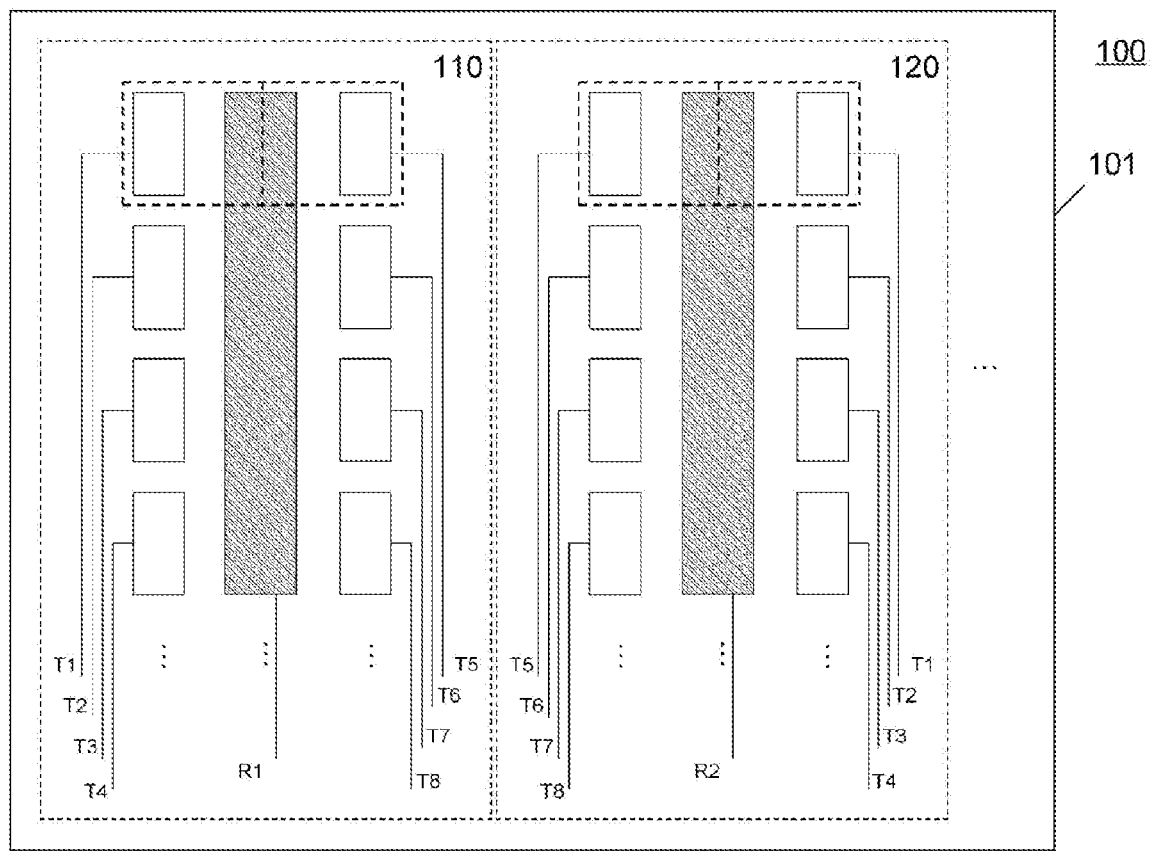
FIGS. 3(a) to 3(c) schematically illustrate variations of the touch input device according to an embodiment of the present disclosure.
Figure 3B:
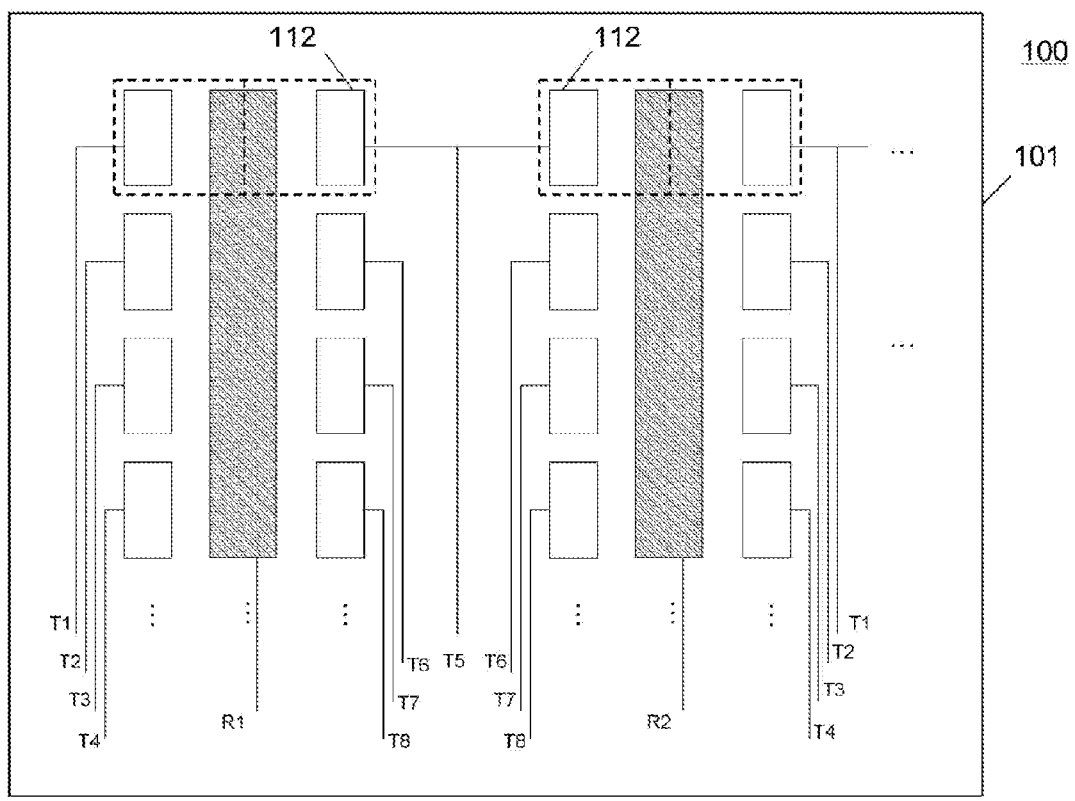
Figure 3C:
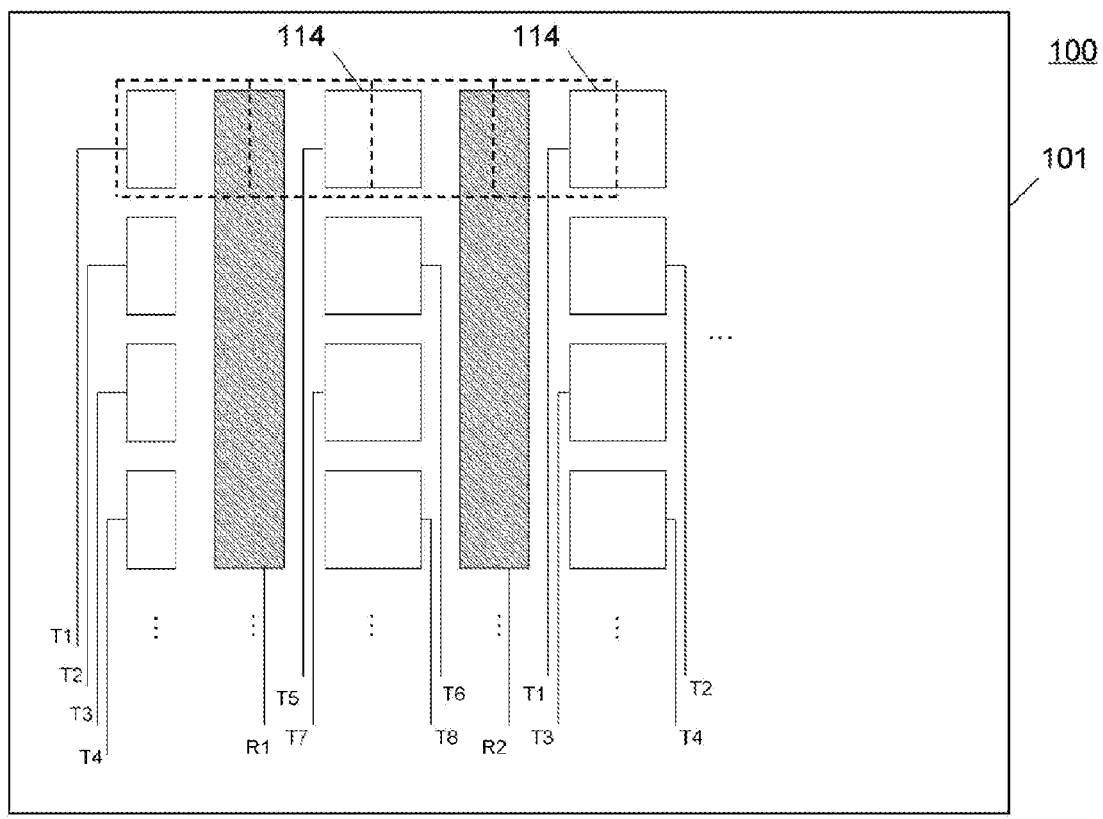

FIGS. 3(a) to 3(c) schematically illustrate variations of the touch input device 100 according to an embodiment of the present disclosure.

As shown in FIG. 3(a), the touch input device 100 comprises at least one electrode structural unit 110 and at least one electrode structural unit 120 that are formed in a single layer on a substrate 101. The electrode structural unit 120 is identical with the electrode structural unit 110, except that in the electrode structural unit 120 the driving signal leads to which the first column of driving electrodes is connected and the ones to which the second column of driving electrodes is connected, are interchanged. In other words, in the electrode structural unit 110, the driving electrodes of the left column are connected to the driving signal leads T1, T2, T3 and T4, respectively, and the driving electrodes of the right column are connected to the driving signal leads T5, T6, T6 and T8, respectively. However, in the electrode structural unit 120, the driving electrodes of the left column are connected to the driving signal leads T5, T6, T7 and T8, respectively, and the driving electrodes of the right column are connected to the driving signal leads T1, T2, T3 and T4, respectively. In the touch input device 100, at least one electrode structural unit 110 and at least one electrode structural unit 120 are arranged alternately in the row direction to form an electrode array. As known to those skilled in the art, the driving electrodes located at corresponding positions in respective electrode structural units 110 are connected to the same driving signal, the driving electrodes located at corresponding positions in respective electrode structural units 120 are connected to the same driving signal, and the sensing electrodes in respective electrode structural units 110 and respective electrode structural units 120 are connected to respective different sensing signals.

As shown in FIG. 3(b), between adjacent electrode structural units 110 and 120, the last pair of first driving electrodes 112 in a direction opposite to a direction in which the driving signal leads T1, T2, T3 . . . T8 extend shares the same driving signal lead. In this way, as compared with the example shown in FIG. 3(a), one driving signal lead can be reduced between adjacent electrode structural units 110 and 120.

As shown in FIG. 3(c), between adjacent electrode structural units 110 and 120, each pair of adjacent first driving electrodes 112 in the row direction is merged into one complete second driving electrode 114. In this way, as compared with the example shown in FIG. 3(a), four driving signal leads can be reduced between adjacent electrode structural units 110 and 120. The area of the second driving electrode 114 may be two times larger than that of the first driving electrode 112, such that the capacitors formed between the sensing electrodes and the driving electrodes have substantially equal capacitance in the entire electrode array formed by the at least one electrode structural unit 110 and the at least one electrode structural unit 120, thereby creating substantially uniformly distributed touch sensitivity.

Figure 4:
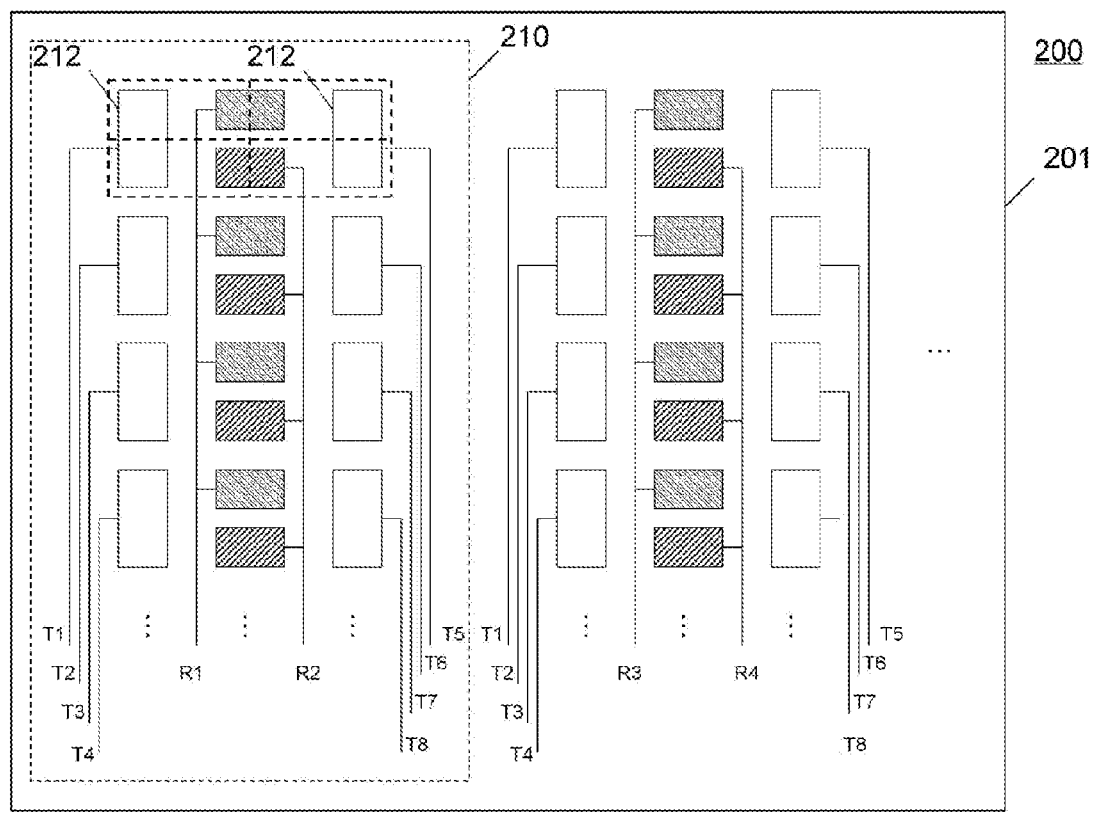
FIG. 4 schematically illustrates a touch input device according to another embodiment of the present disclosure.

FIG. 4 schematically illustrates a touch input device 200 according to another embodiment of the present disclosure. The touch input device 200 comprises at least one electrode structural unit 210 in a single layer on a substrate 201. As shown in the figure, the electrode structural unit 210 comprises a third column of driving electrodes on the left side, a fourth column of driving electrodes on the right side and a column of sensing electrodes between the third column of driving electrodes and the fourth column of driving electrodes. In other words, the third column of driving electrodes, the column of sensing electrodes and the fourth column of driving electrodes are arranged successively in a row direction.

In the electrode structural unit 210, the third column of driving electrodes and the fourth column of driving electrodes each comprise at least one third driving electrode 212, each of which is connected to a respective different driving signal lead T1, T2, T3 . . . T8. The column of sensing electrodes comprises at least two groups of sensing electrodes, as marked by different shadow lines in FIG. 4, wherein sensing electrodes of the same group are connected to the same sensing signal lead, while sensing electrodes of different groups are connected to different sensing signal leads. For example, in FIG. 4, two groups of sensing electrodes marked with different shadow lines are connected to sensing signal leads R1 and R2, respectively.

A portion of each sensing electrode and a portion of a corresponding third driving electrode 212 in the first column of driving electrodes form a capacitor, and another portion of each sensing electrode and a portion of a corresponding third driving electrode 212 in the second column of driving electrodes form a capacitor. The portion of the sensing electrode and the portion of the third driving electrode 212 which form the capacitor are adjacent in the row direction. For example, as shown by the bold dashed boxes in FIG. 4, the third driving electrode 212 on the left side, the third driving electrode 212 on the right side and the two sensing electrodes therebetween form four capacitors, wherein the upper portion of the third driving electrode 212 on the left side and the left portion of the upper sensing electrode form one capacitor, the upper portion of the third driving electrode 212 on the right side and the right portion of the upper sensing electrode form one capacitor, the lower portion of the third driving electrode 212 on the left side and the left portion of the lower sensing electrode form one capacitor, and the lower portion of the third driving electrode 212 on the right side and the right portion of the lower sensing electrode form one capacitor.

It is desirable that respective capacitors formed by the sensing electrodes and the driving electrodes have substantially equal capacitance to create uniformly distributed touch sensitivity. As stated above, due to the manufacture precision, the capacitance of respective capacitors may be different within a certain error range. By way of example, and not limitation, the error may be 5% or other values. As shown in FIG. 4, the capacitance of the four capacitors marked by the bold dashed boxes may be substantially equal. For example, in the electrode structural unit 210, the areas of the portions of each sensing electrode that form capacitors with the third driving electrodes 212 in the first column of driving electrodes or the second column of driving electrodes may be substantially equal, and the driving electrodes of the first column and the driving electrodes of the second column may be symmetrical with respect to the column of sensing electrodes. For instance, as shown in FIG. 4, the upper and lower sensing electrodes are divided by the bold dashed boxes into two portions, respectively, the resultant four portions have substantially equal areas, and the areas are also substantially equal to the areas of the portions of the sensing electrodes which correspond to other third driving electrodes 212.

In this way, in the touch input device 200 as shown in FIG. 4, only two sensing signal leads R1 and R2, and eight driving signal leads T1, T2, T3 . . . T8, are needed to form sixteen capacitors (detection points). However, in the prior art as shown in FIG. 1, two sensing signal leads and sixteen driving signal leads are needed. Therefore, as compared to the prior art, the number of driving signal leads is reduced in this embodiment.

In the electrode arrangement shown in FIG. 4, two groups of sensing electrodes are arranged alternately in the column direction. It is to be understood that the electrode arrangement shown in FIG. 4 is just exemplary. In practice, in this embodiment, at least two groups of sensing electrodes can be such arranged in the column direction that each of the third driving electrodes 212 forms a capacitor with a portion of only one sensing electrode in each group in the at least two groups of sensing electrodes. In other words, analogous to the concept of "traversing" in the path search, each third driving electrode 212 "traverses" the sensing electrodes of each group once and only once (further discussed below).

The at least one electrode structural unit 210 is arranged successively in the row direction to form a touch electrode array of the touch input device 200. As known to those skilled in the art, the driving electrodes located at corresponding positions in respective electrode structural units 210 are connected to the same driving signal. In this example, the driving signals are provided by a driving module via the driving signal leads T1, T2, T3 . . . T8. The sensing electrodes in respective electrode structural units 210 are connected to different sensing signals. In this example, the sensing signals are provided by a sensing module via the sensing signal leads R1, R2, R3, R4, R5, R6 . . . corresponding to respective electrode structural units 210.

FIGS. 5(a) to 5(f) schematically illustrate variations of the electrode structural unit 210 in the touch input device 200 as shown in FIG. 4.

Figure 5A:
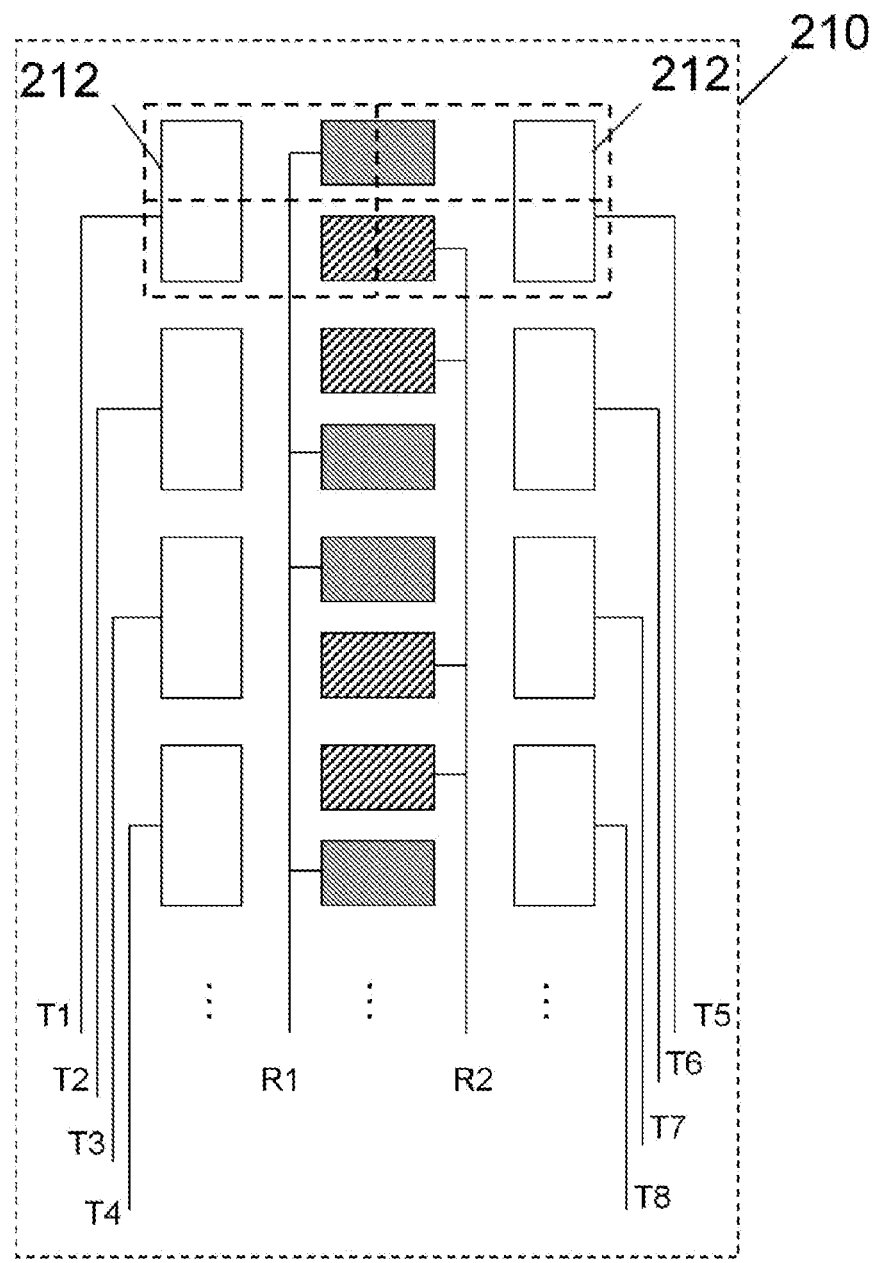
FIGS. 5(a) to 5(f) schematically illustrate variations of the electrode structural unit in the touch input device shown in FIG. 4.

FIG. 5(a) illustrates a sensing electrode arrangement different from that in FIG. 4. The respective sensing electrodes are arranged from top to down in the order of R1, R2, R2, R1, R1, R2, R2, R1 . . . , and so on (in the description below, the symbols "Rx"s of the sensing signal leads to which the respective sensing electrodes are connected will be used to represent different sensing electrode groups). In such an arrangement, the column of sensing electrodes may comprise two types of sub-columns that are arranged alternately in the column direction, wherein each sub-column consists of one sensing electrode in each sensing electrode group, the sensing electrodes in the first type of sub-column are arranged in a first order, and the sensing electrodes in the second type of sub-column are arranged in a second order reverse to the first order. For example, as shown in FIG. 5(a), the respective sensing electrodes are arranged from top to down in the order of R1, R2, R2, R1, R1, R2 . . . , and so on. In this example, the first type of sub-column is R1-R2, and the second type of sub-column is R2-R1. As stated above, each third driving electrode 212 "traverses" the sensing electrodes R1 and R2 once. Further, the capacitors formed by the sensing electrodes and the corresponding third driving electrodes 212 may have substantially equal capacitance.

Figure 5B:
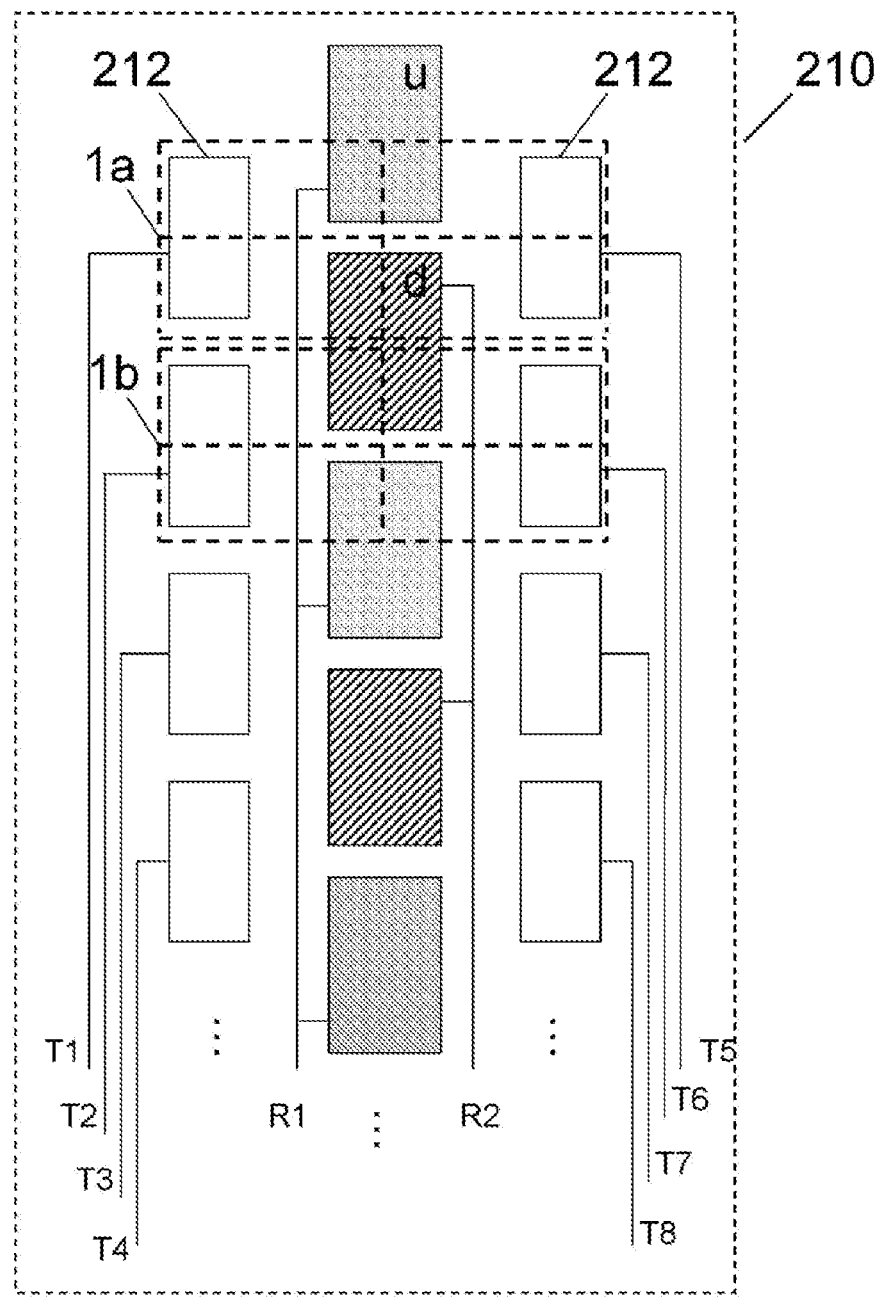

Alternatively, FIG. 5(b) illustrates a variation of the sensing electrode arrangement shown in FIG. 5(a), in which two sensing electrodes that are adjacent in the column direction and belong to the same group are merged into one complete electrode. In this case, as shown by the bold dashed box 1a in FIG. 5(b), the third driving electrode 212 on the left side, the third driving electrode 212 on the right side and two sensing electrodes u, d therebetween form four capacitors, wherein the upper portion of the third driving electrode 212 on the left side and the lower left portion of the sensing electrode u form one capacitor, the upper portion of the third driving electrode 212 on the right side and the lower right portion of the sensing electrode u form one capacitor, the lower portion of the third driving electrode 212 on the left side and the upper left portion of the sensing electrode d form one capacitor, and the lower portion of the third driving electrode 212 on the right side and the upper right portion of the sensing electrode d form one capacitor. Particularly, as shown by the bold dashed box 1b, for the sensing electrode d, its lower left portion further forms one capacitor with the upper portion of the driving electrode on its left side, and its lower right portion further forms one capacitor with the upper portion of the driving electrode on its right side. As stated above, each third driving electrode 212 "traverses" the sensing electrodes R1 and R2 once. Further, the capacitors formed by the sensing electrodes and the corresponding third driving electrodes 212 may have substantially equal capacitance.

Figure 5C:
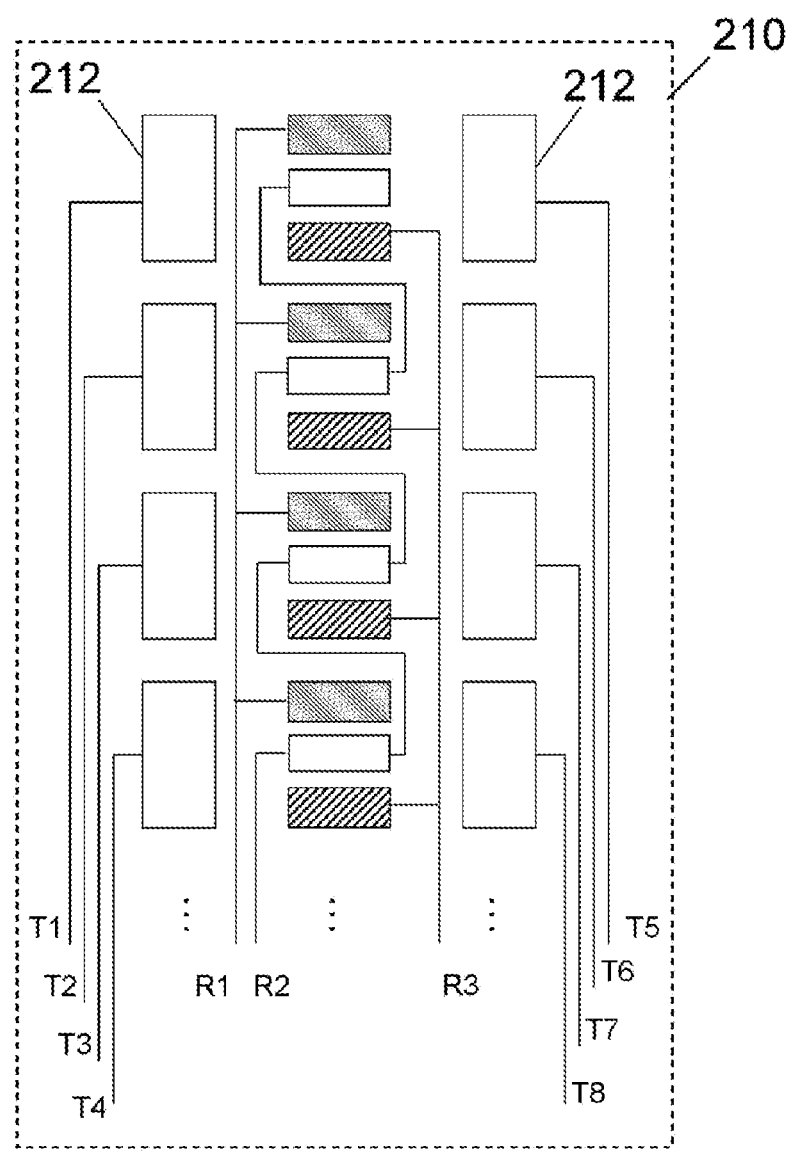

FIG. 5(c) schematically illustrates an electrode structural unit 210 having three groups of sensing electrodes in the touch input device 200 according to an embodiment of the present disclosure, in which the respective sensing electrodes are arranged from top to down in the order of R1, R2, R3, R1, R2, R3 . . . , and so on. As stated above, each third driving electrode 212 "traverses" the sensing electrodes R1, R2 and R3 once. Further, the capacitors formed by the sensing electrodes and the corresponding third driving electrodes 212 may have substantially equal capacitance.

In this way, in the touch input device 200 as shown in FIG. 5(c), only three sensing signal leads R1, R2 and R3, and eight driving signal leads T1, T2, T3 . . . T8, are needed to form twenty-four capacitors (detection points). However, in the prior art shown in FIG. 1, three sensing signal leads and twenty-four driving signal leads are needed. Therefore, as compared to the prior art, the number of driving signal leads is reduced in this embodiment.

It is noted that in the sensing electrode arrangement shown in FIG. 5(c), since there are three groups of sensing signal leads R1, R2 and R3, while the sensing signal leads can only be led out from two sides of the sensing electrode, in order to avoid intersection between the sensing signal leads, wiring must be done between adjacent sensing electrodes along the row direction (e.g. wiring of the sensing electrode R2). This may be disadvantageous because the spacing between the sensing electrodes is very small, and such a design would require high processing precision and may result in crosstalk between scanning signals.

Figure 5D:
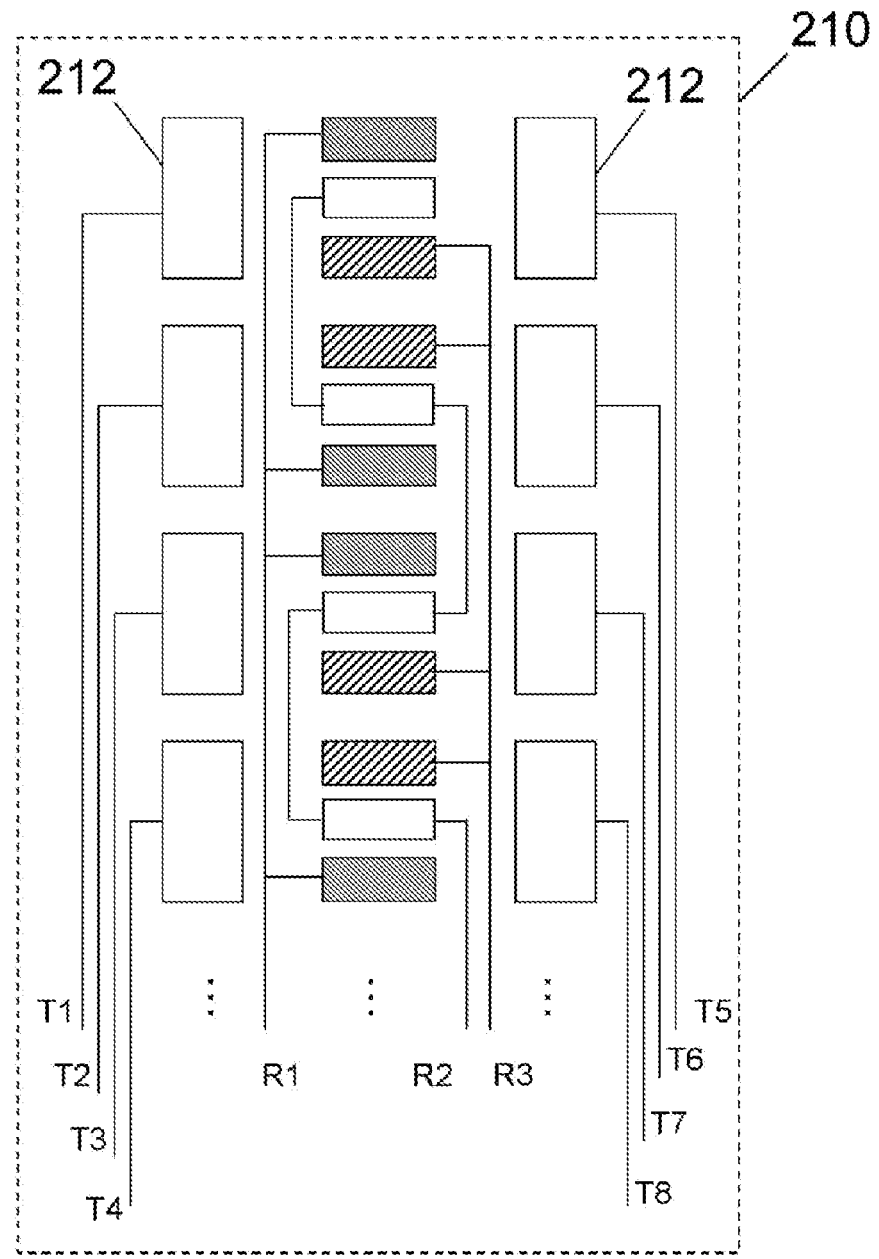

FIG. 5(d) illustrates a variation of the sensing electrode arrangement shown in FIG. 5(c), in which the respective sensing electrodes are arranged from top to down in the order of R1, R2, R3, R3, R2, R1 . . . , and so on. In this example, the column of sensing electrodes may comprise two types of sub-columns arranged alternately in the column direction, wherein the first type of sub-column is R1-R2-R3, and the second type of sub-column is R3, R2, R1. As stated above, each third driving electrode 212 "traverses" the sensing electrodes R1, R2 and R3 once. Use of such an arrangement avoids wiring between adjacent sensing electrodes along the row direction, and hence the above possible deficiency. Further, the capacitors formed by the sensing electrodes and the corresponding third driving electrodes 212 may have substantially equal capacitance.

Figure 5E:
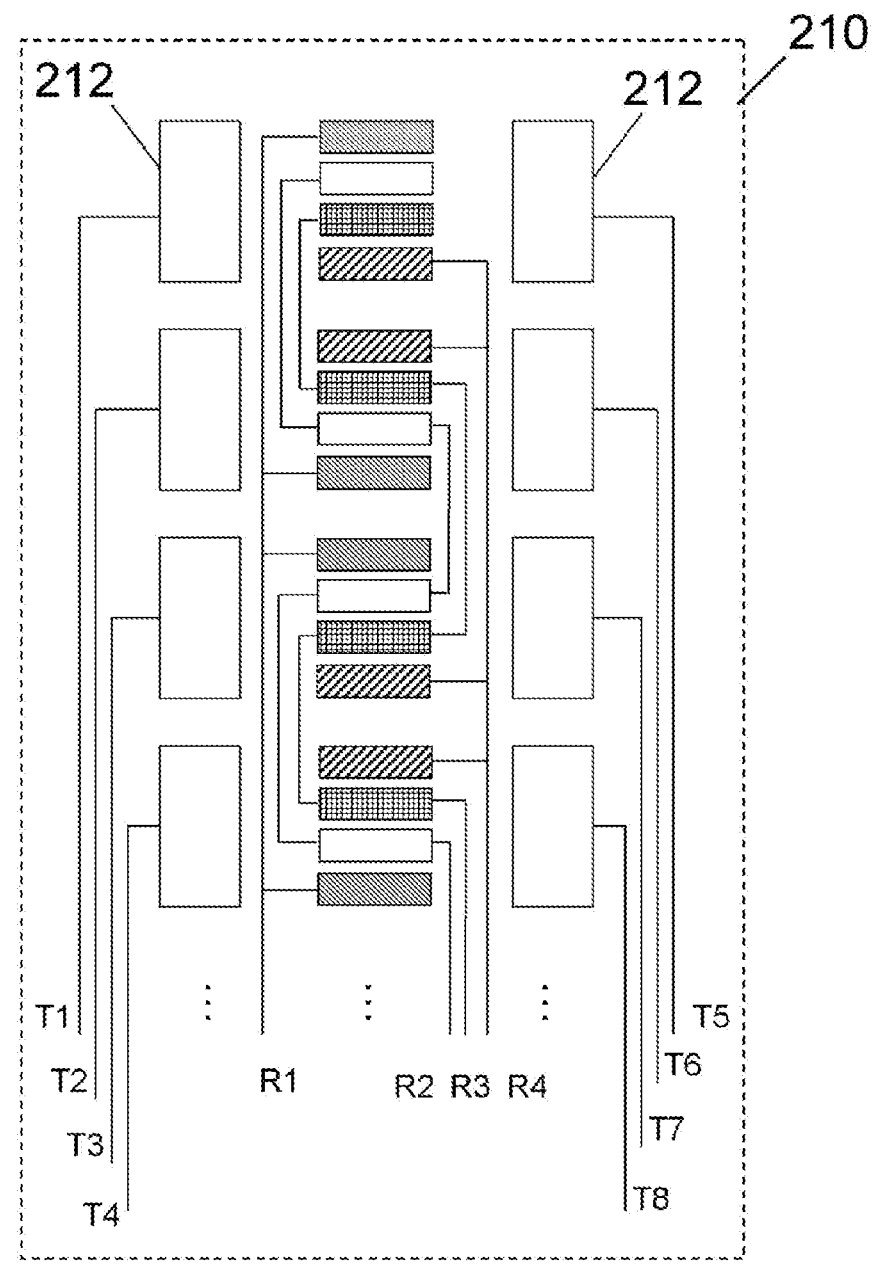

FIG. 5(e) further adds one group of sensing electrodes on the basis of the sensing electrodes in FIG. 5(d). The respective sensing electrodes are arranged from top to down in the order of R1, R2, R3, R4, R4, R3, R2, R1 . . . , and so on. In this example, the first type of sub-column is R1-R2-R3-R4, and the second type of sub-column is R4-R3-R2-R1. As stated above, each third driving electrode 212 "traverses" the sensing electrodes R1, R2, R3 and R4 once. Use of such an arrangement avoids wiring between adjacent sensing electrodes along the row direction, and hence the above possible deficiency. Further, the capacitors formed by the sensing electrodes and the corresponding third driving electrodes 212 may have substantially equal capacitance.

In this way, in the touch input device 200 as shown in FIG. 5(e), only four sensing signal leads R1, R2, R3 and R4, and four driving signal leads T1, T2, T3, T4, are needed to form sixteen capacitances (detection points). However, in the prior art shown in FIG. 1, two sensing signal leads and sixteen driving signal leads are needed. Therefore, as compared to the prior art, the number of driving signal leads is reduced in this embodiment.

Figure 5F:
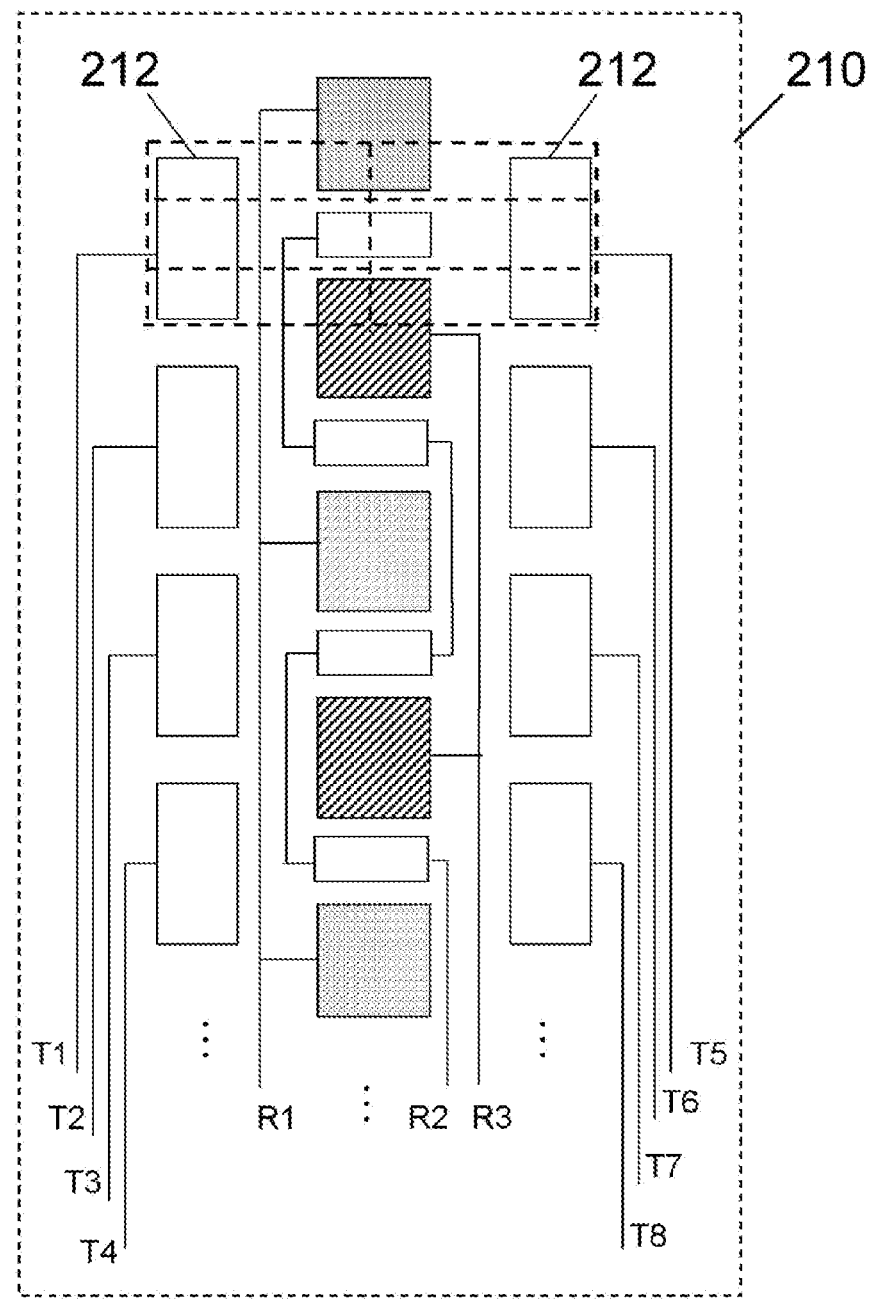

FIG. 5(f) illustrates a variation of the sensing electrode arrangement shown in FIG. 5(d), in which two sensing electrodes that are adjacent in the column direction and belong to the same group are merged into one complete electrode. In this case, as shown by the bold dashed boxes in FIG. 5(f), the third driving electrode 212 on the left side, the third driving electrode 212 on the right side and three sensing electrodes therebetween form six capacitors. As stated above, each third driving electrode 212 "traverses" the sensing electrodes R1, R2 and R3 once. Further, the capacitors formed by the sensing electrodes and the corresponding third driving electrodes 212 may have substantially equal capacitance.

Referring back to FIG. 4, in the touch input device 200, the at least one electrode structural unit 210 is arranged successively in the row direction to form an electrode array on the substrate 201. It is to be understood that the electrode structural unit 210 in the touch input device 200 may be any one of the electrode structural units 210 shown in FIGS. 5(a) to 5(f), and the electrode structural units 210 shown in FIGS. 5(a) to 5(f) are only illustrative rather than restrictive. For example, it is also possible to use five or even more groups of sensing electrodes in the electrode structural unit 210.

Figure 6:
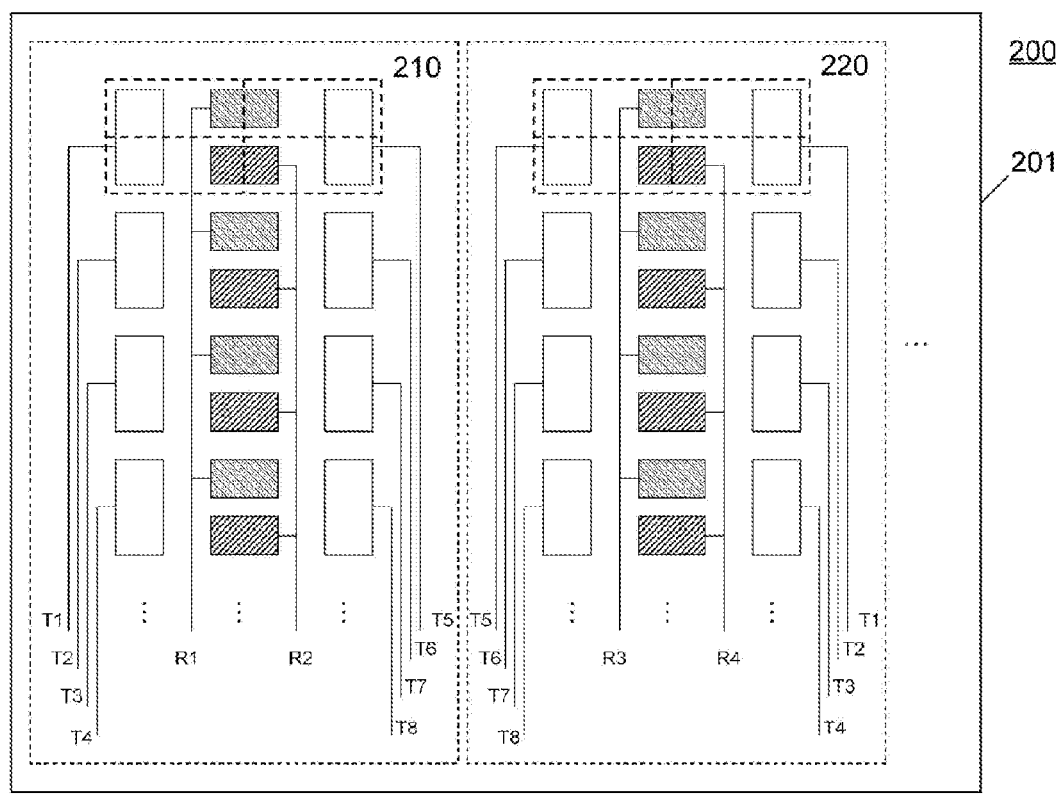
FIG. 6 schematically illustrates a variation of the touch input device shown in FIG. 4.

FIG. 6 schematically illustrates a variation of the touch input device 200 shown in FIG. 4. The touch input device 200 comprises at least one electrode structural unit 210 and at least one electrode structural unit 220 in a single layer on a substrate 201. As shown in the figure, the electrode structural unit 220 is identical with the electrode structural unit 210, except that in the electrode structural unit 220 the driving signal leads to which the first column of driving electrodes is connected and the ones to which the second column of driving electrodes is connected are interchanged. In other words, in the electrode structural unit 210, the driving electrodes of the left column are connected to the driving signal leads T1, T2, T3 and T4, respectively, and the driving electrodes of the right column are connected to the driving signal leads T5, T6, T6 and T8, respectively. However, in the electrode structural unit 220, the driving electrodes of the left column are connected to the driving signal leads T5, T6, T7 and T8, respectively, and the driving electrodes of the right column are connected to the driving signal leads T1, T2, T3 and T4, respectively. In the touch input device 200, the at least one electrode structural unit 210 and the at least one electrode structural unit 220 are arranged alternately in the row direction to form an electrode array. As known to those skilled in the art, the driving electrodes located at corresponding positions in respective electrode structural units 210 are connected to the same driving signal, the driving electrodes located at corresponding positions in respective electrode structural units 220 are connected to the same driving signal, and the sensing electrodes in respective electrode structural units 210 and respective electrode structural units 220 are connected to respective different sensing signals.

Figure 7:
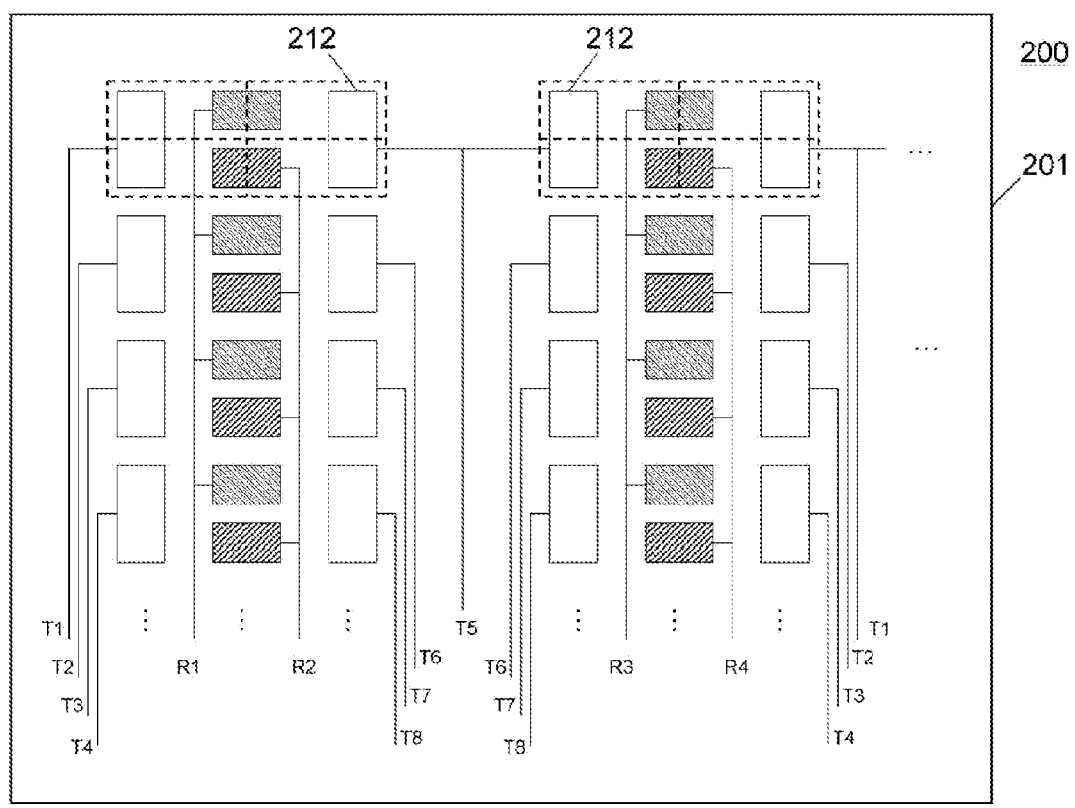
FIG. 7 schematically illustrates a variation of the touch input device shown in FIG. 6.

FIG. 7 schematically illustrates a variation of the touch input device 200 shown in FIG. 6, in which the last pair of first driving electrodes 112 between adjacent electrode structural units 210 and 220 in a direction opposite to a direction in which the diving signal leads T1, T2, T3 . . . T8 extend shares the same driving signal lead. In this way, as compared with the example shown in FIG. 6, one driving signal lead can be reduced between adjacent electrode structural units 210 and 220.

Figure 8:
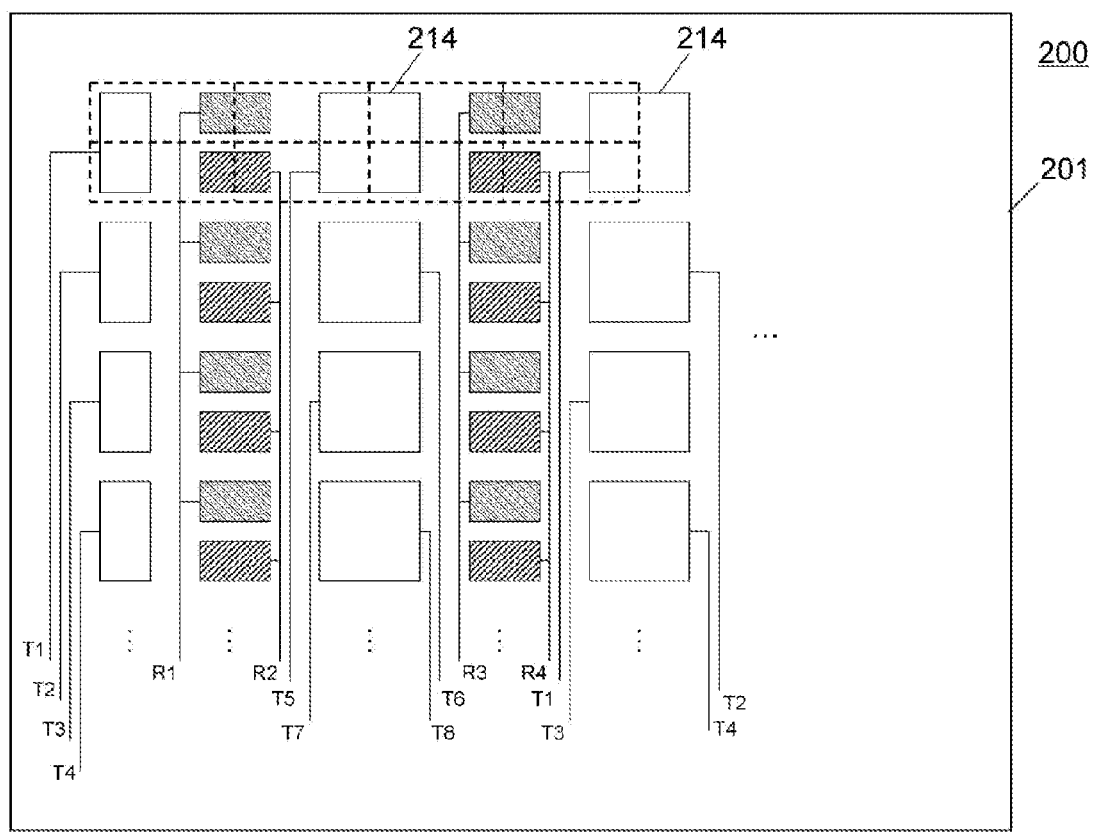
FIG. 8 schematically illustrates another variation of the touch input device shown in FIG. 6.

FIG. 8 schematically illustrates another variation of the touch input device 200 shown in FIG. 6, in which each pair of adjacent first driving electrodes 212 between adjacent electrode structural units 210 and 220 in the row direction is merged into one complete fourth driving electrode 214. In this way, as compared with the example shown in FIG. 6, four driving signal leads can be reduced between adjacent electrode structural units 210 and 220. The fourth driving electrode 214 may have an area two times larger than that of the third driving electrode 212, such that the capacitors formed between the sensing electrodes and the driving electrodes have substantially equal capacitance in the entire electrode array formed by the at least one electrode structural unit 210 and the at least one electrode structural unit 220, thereby creating substantially uniformly distributed touch sensitivity.

It is to be understood that in the touch input devices 200 shown in FIGS. 6, 7 and 8, the sensing electrodes in the electrode structural units 210 and 220 may be arranged in any of the sensing electrode arrangements shown in FIGS. 5(a) to 5(f), and the sensing electrode arrangements shown in FIGS. 5(a) to 5(f) are only illustrative rather than restrictive.

Figure 9:
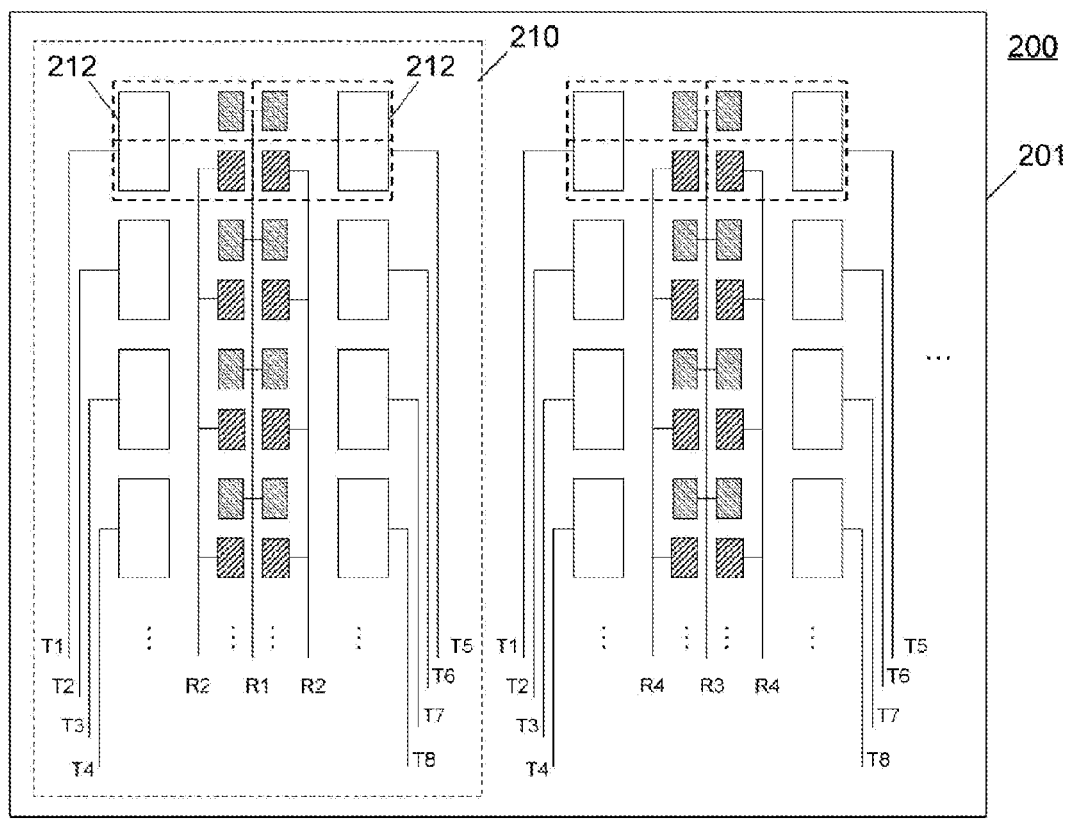
FIG. 9 schematically illustrates another variation of the touch input device shown in FIG. 4.

FIG. 9 schematically illustrates another variation of the touch input device 200 shown in FIG. 4. In the touch input device 200, each sensing electrode comprises a first sub-sensing electrode and a second sub-sensing electrode which are adjacent in the row direction. In other words, one sensing electrode is split into two adjacent sub-sensing electrodes in the row direction. In this case, the first sub-sensing electrode corresponds to the portion of the sensing electrode which forms a capacitor with a portion of a corresponding third driving electrode in the third column of driving electrodes, and the second sub-sensing electrode corresponds to the portion of the sensing electrode which forms a capacitor with a portion of a corresponding third driving electrode in the fourth column of driving electrodes.

Similar to the touch input device 200 shown in FIG. 4, the first sub-sensing electrode and a portion of the corresponding third driving electrode 212 in the third column of driving electrodes form a capacitor, and the second sub-sensing electrode and a portion of the corresponding third driving electrode 212 in the fourth column of driving electrodes form a capacitor. The first sub-sensing electrode or second sub-sensing electrode and the portion of the third driving electrode 212 which form the capacitor are adjacent in the row direction. For example, as shown by the bold dashed boxes in FIG. 9, the third driving electrode 212 on the left side, the third driving electrode 212 on the right side and four sub-sensing electrodes therebetween form four capacitors, wherein the upper portion of the third driving electrode 212 on the left side and the upper first sub-sensing electrode form one capacitor, the upper portion of the third driving electrode 212 on the right side and the upper second sub-sensing electrode form one capacitor, the lower portion of the third driving electrode 212 on the left side and the lower first sub-sensing electrode form one capacitor, and the lower portion of the third driving electrode 212 on the right side and the lower second sub-sensing electrode form one capacitor. As stated above, each third driving electrode 212 "traverses" the (sub) sensing electrodes R1 and R2 once.

In this way, in the touch input device 200 shown in FIG. 9, only three sensing signal leads R1 and R2, and eight driving signal leads T1, T2, T3 . . . T8, are needed to form sixteen capacitors (detection points). However, in the prior art as shown in FIG. 1, three sensing signal leads and sixteen driving signal leads are needed. Therefore, as compared to the prior art, the number of driving signal leads is also reduced in this embodiment.

FIGS. 10(a) to 10(g) schematically illustrate variations of the electrode structural unit 210 in the touch input device 200 shown in FIG. 9.

Figure 10A:
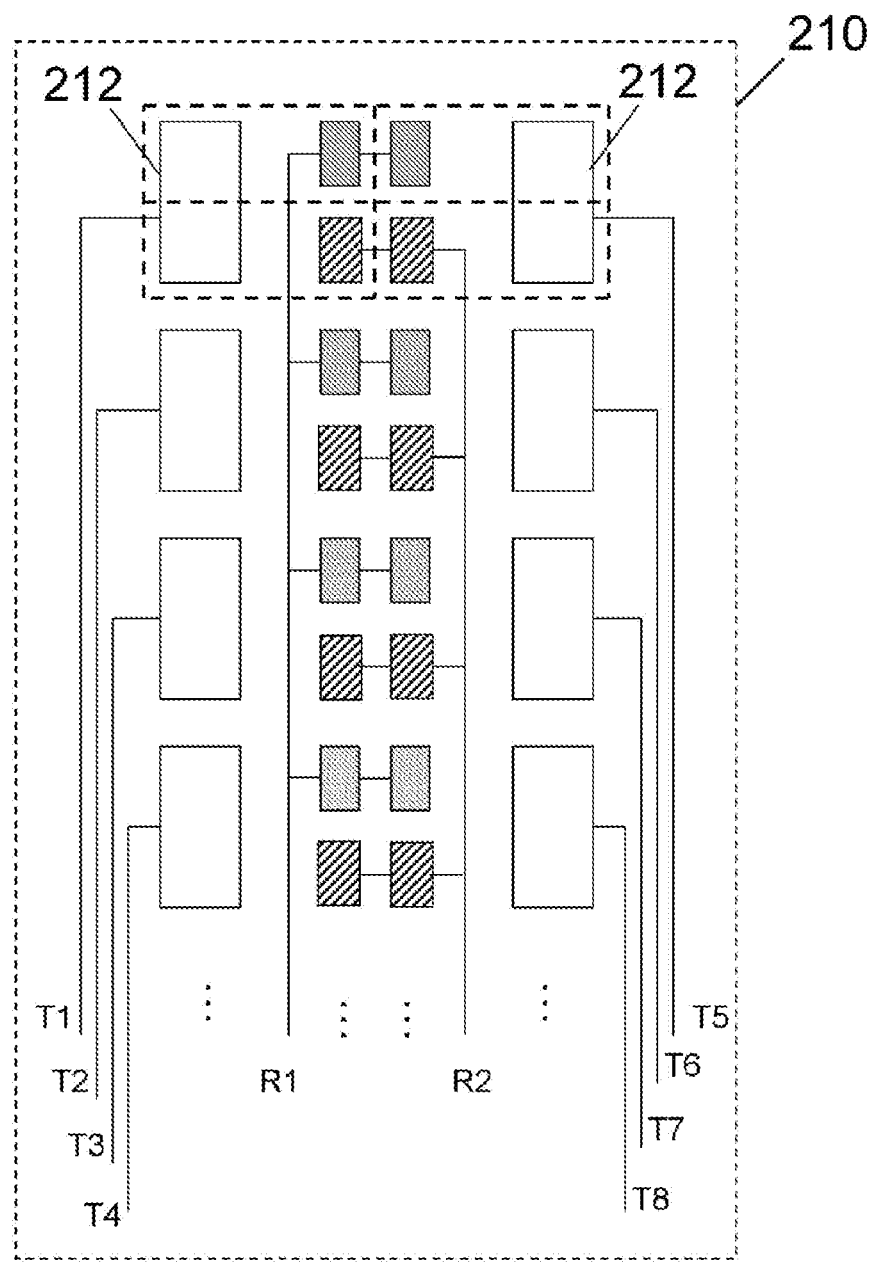
FIGS. 10(a) to 10(g) schematically illustrate variations of the electrode structural unit in the touch input device shown in FIG. 9.

The electrode arrangement in FIG. 10(a) is the same as the electrode arrangement of the electrode structural unit 210 in FIG. 9, except for the wiring of the sensing signal leads of the sensing electrodes. As compared to the former, one sensing signal lead is reduced in each electrode structural unit 210.

Figure 10B:
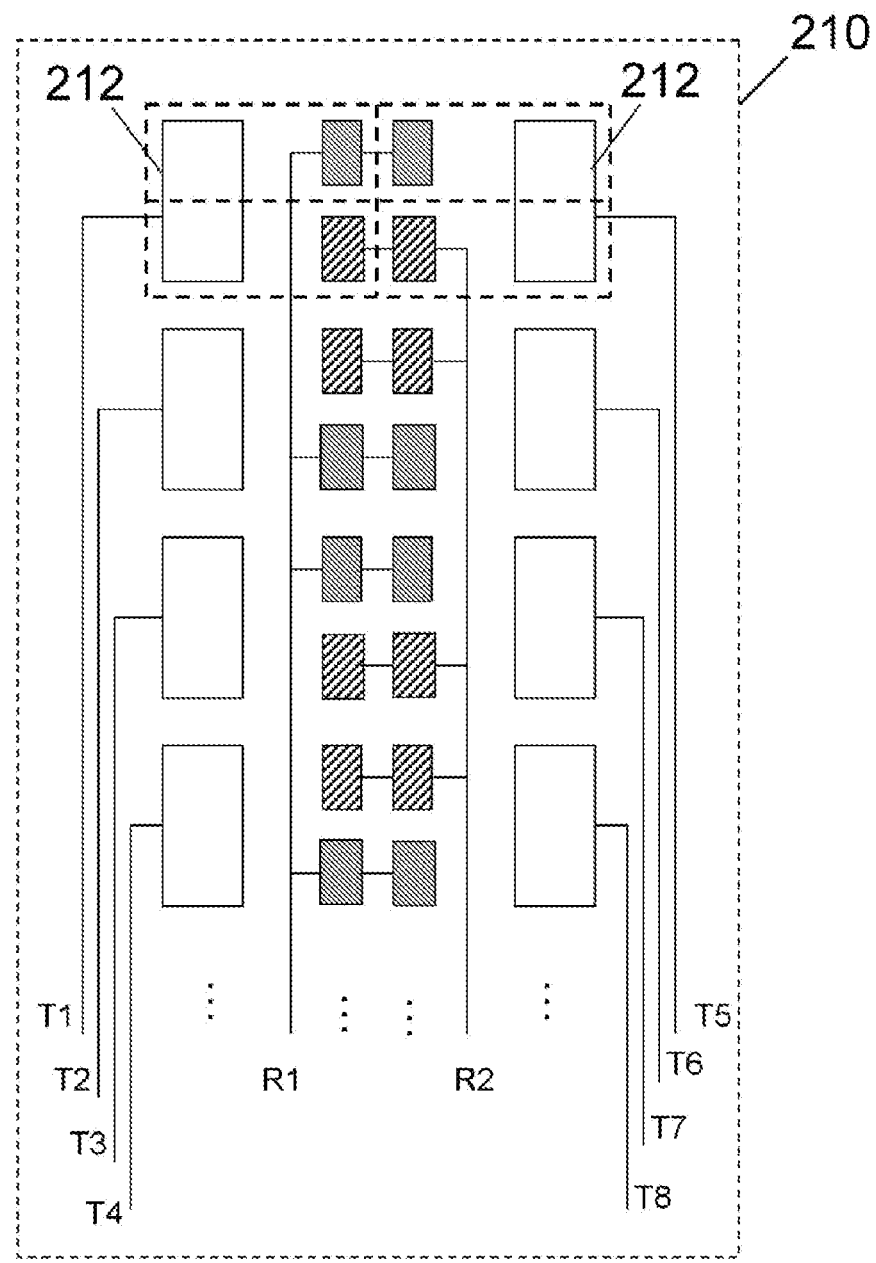

Similar to FIG. 5(a), FIG. 10(b) illustrates a different sensing electrode arrangement, in which respective sensing electrodes are arranged from top to down in the order of R1, R2, R2, R1, R1, R2, R2, R1 . . . , and so on. Likewise, in such an arrangement, the column of sensing electrodes may comprise two types of sub-columns arranged alternately in the column direction, wherein each sub-column consists of one sensing electrode in each sensing electrode group, the sensing electrodes in the first type of sub-columns are arranged in a first order, and the sensing electrodes in the second type of sub-columns are arranged in a second order reverse to the first order. It is to be noted that in this example, since each sensing electrode comprises a first sub-sensing electrode and a second sub-sensing electrode which are adjacent in the row direction, the column of sensing electrodes actually comprises one column of first sub-sensing electrodes and one column of second sub-sensing electrodes. As stated above, each third driving electrode 212 "traverses" the (sub) sensing electrodes R1 and R2 once.

Figure 10C:
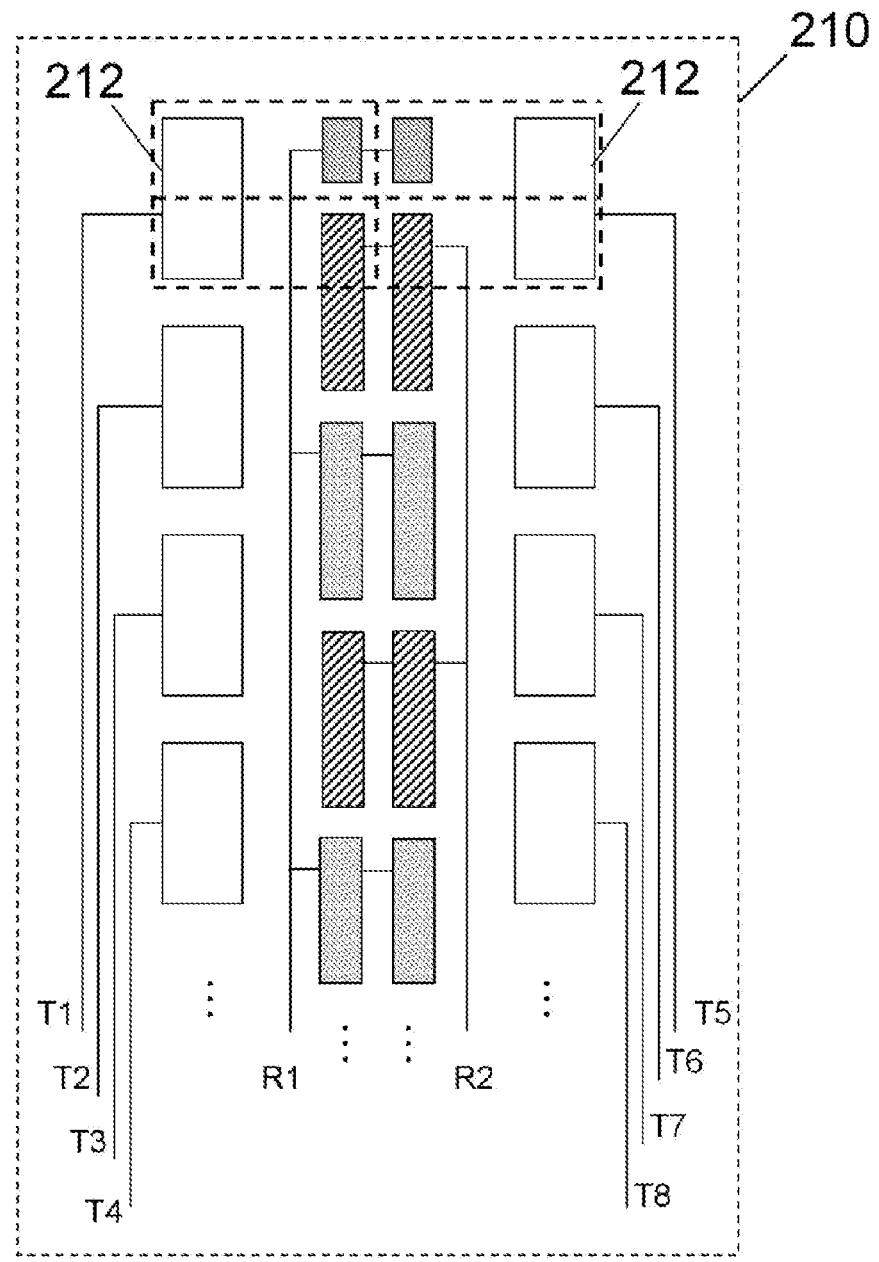

Similar to FIG. 5(b), FIG. 10(c) illustrates a variation of the sensing electrode arrangement shown in FIG. 10(b), in which two first sub-sensing electrodes or second sub-sensing electrodes that are adjacent in the column direction and belong to the same group are merged into one complete electrode. As stated above, each third driving electrode 212 "traverses" the (sub) sensing electrodes R1 and R2 once.

Figure 10D:
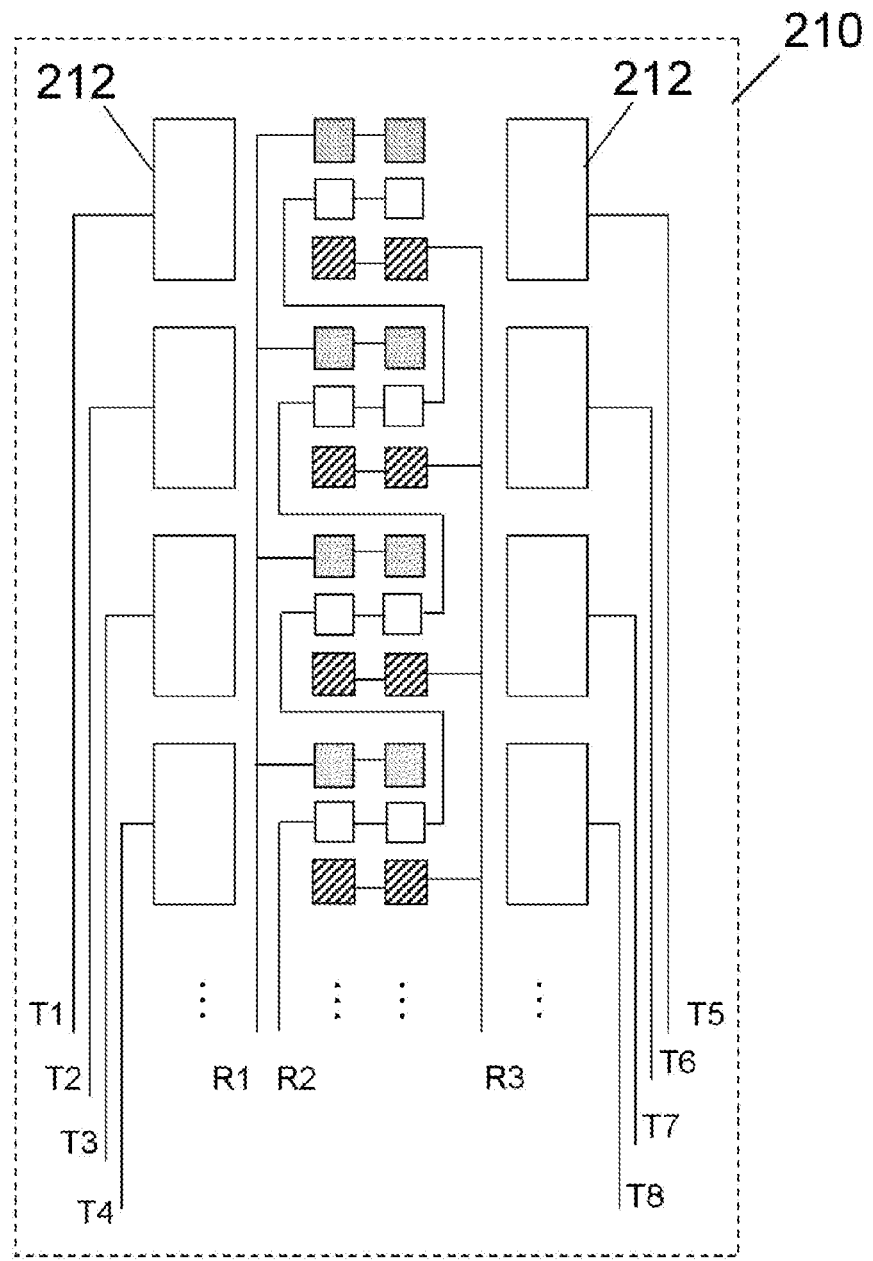

Similar to FIG. 5(c), FIG. 10(d) schematically illustrates an electrode structural unit 210 having three groups of sensing electrodes in the touch input device 200 according to an embodiment of the present disclosure. The respective sensing electrodes are arranged from top to down in the order of R1, R2, R3, R1, R2, R3 . . . , and so on. As stated above, each third driving electrode 212 "traverses" the (sub) sensing electrodes R1, R2 and R3 once.

Figure 10E:
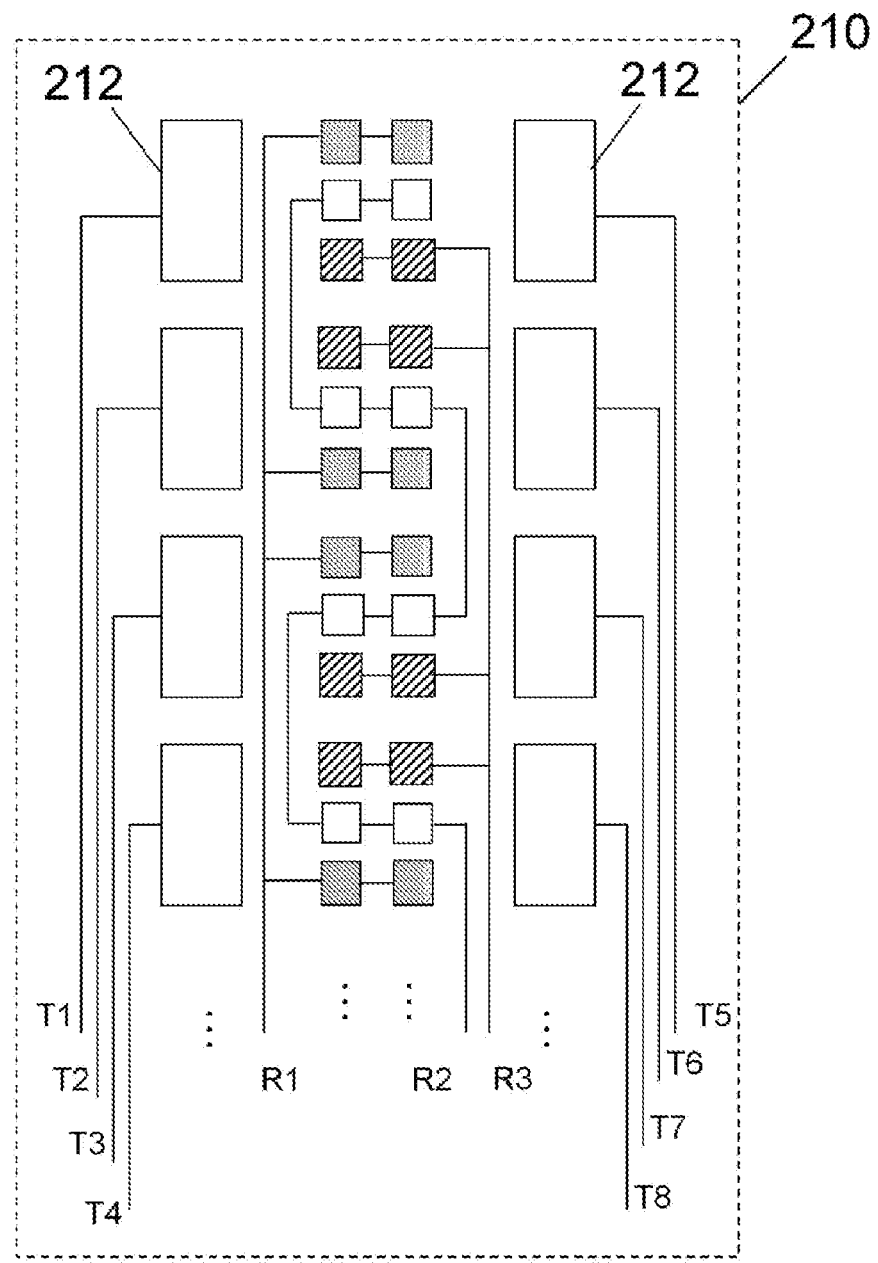

Similar to FIG. 5(d), FIG. 10(e) illustrates a variation of the sensing electrode arrangement manner shown in FIG. 10(d), in which the respective sensing electrodes are arranged from top to down in the order of R1, R2, R3, R3, R2, R1 . . . , and so on. In this example, the column of sensing electrodes may comprise two types of sub-columns arranged alternately in the column direction, wherein the first type of sub-column is R1-R2-R3, and the second type of sub-column is R3-R2-R1. As stated above, each third driving electrode 212 "traverses" the (sub) sensing electrodes R1, R2 and R3 once. Use of such an arrangement avoids wiring between adjacent sensing electrodes along the row direction.

Figure 10F:
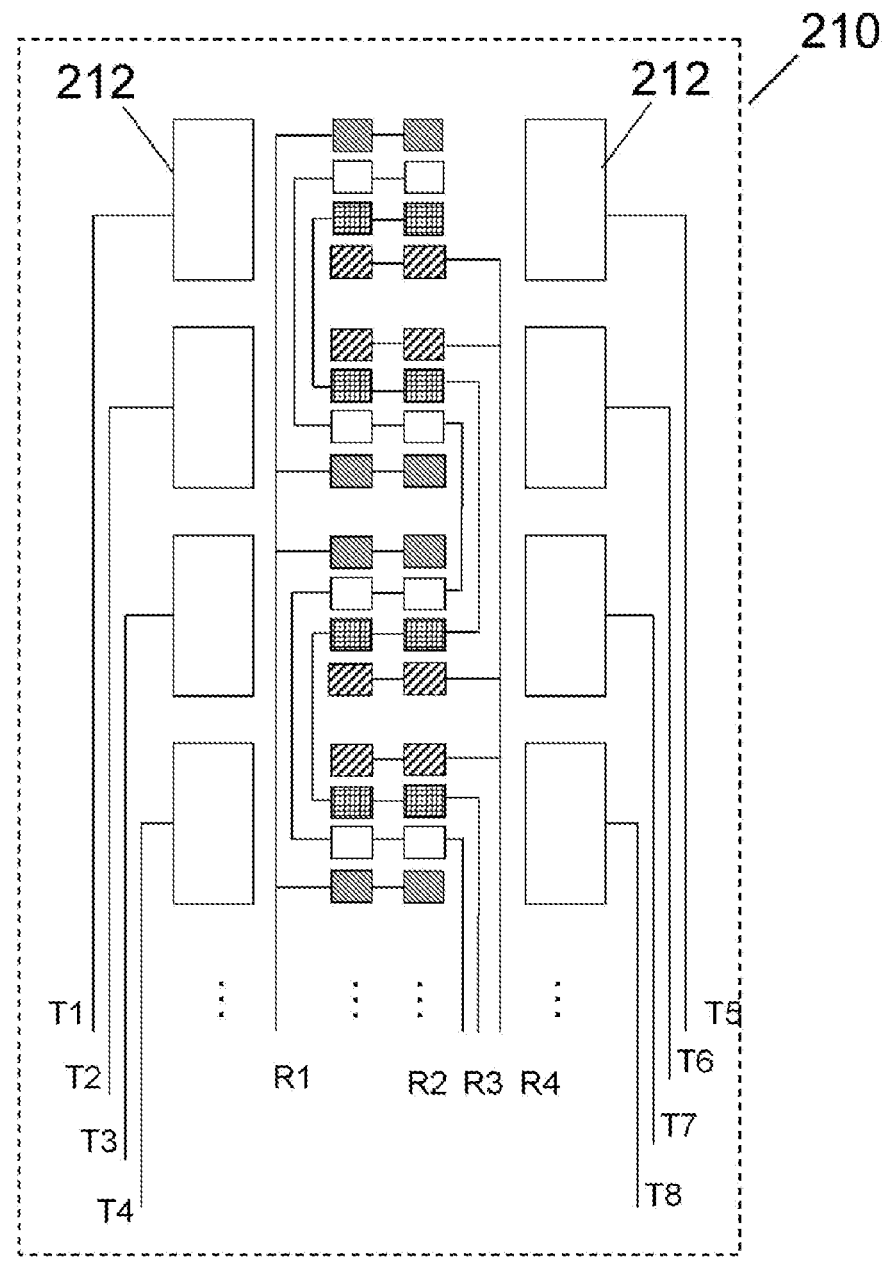

Similar to FIG. 5(e), FIG. 10(f) further adds one group of sensing electrodes on the basis of the sensing electrodes in FIG. 10(e). The respective sensing electrodes are arranged from top to down in the order of R1, R2, R3, R4, R4, R3, R2, R1 . . . , and so on. In this example, the first type of sub-column is R1-R2-R3-R4, and the second type of sub-column is R4-R3-R2-R1. As stated above, each third driving electrode 212 "traverses" the (sub) sensing electrodes R1, R2, R3 and R4 once. Use of such an arrangement avoids wiring between adjacent sensing electrodes along the row direction.

Figure 10G:
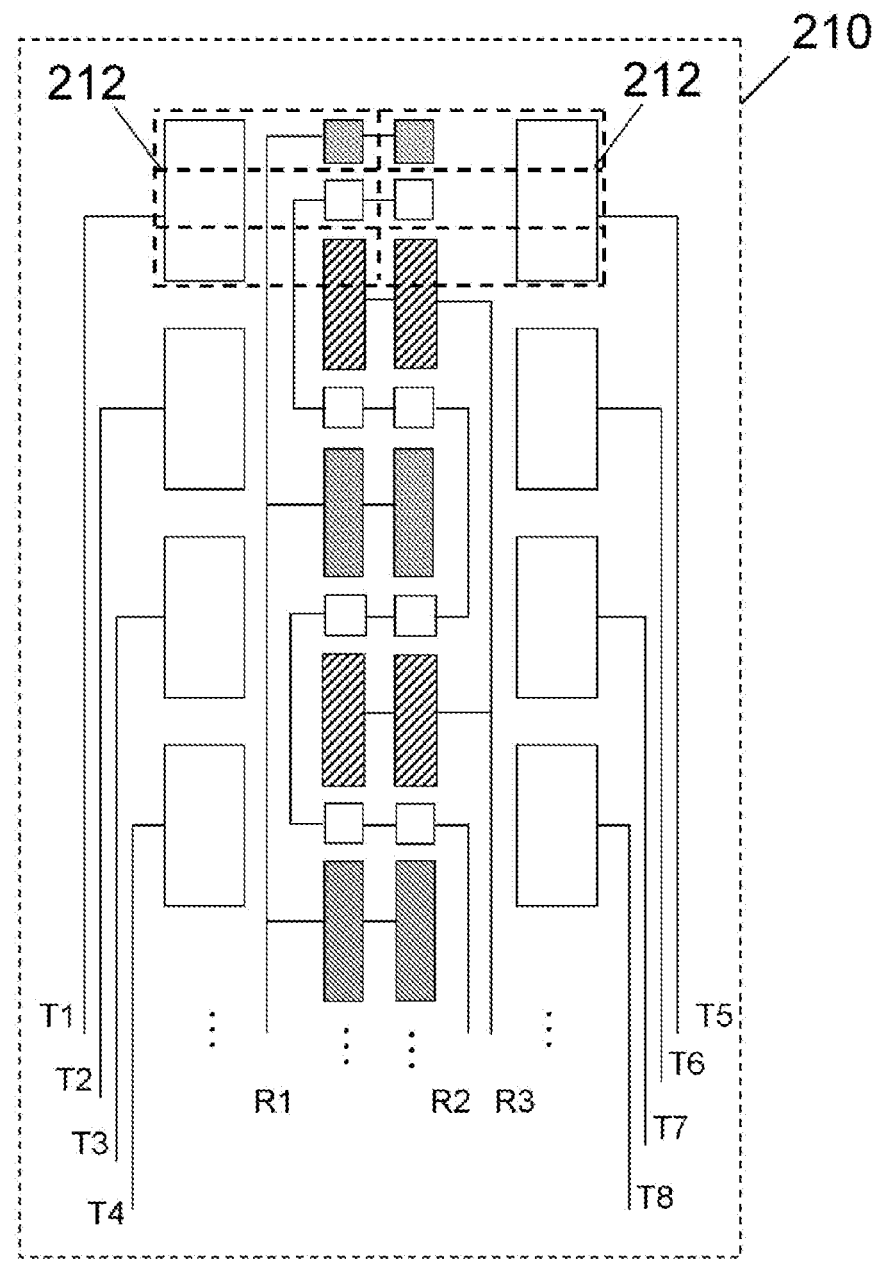

Similar to FIG. 5(f), FIG. 10(g) illustrates a variation of the sensing electrode arrangement manner shown in FIG. 10(e), in which two first sub-sensing electrodes or second sub-sensing electrodes that are adjacent in the column direction and belong to the same group are merged into one complete electrode. In this case, as shown by the bold dashed boxes in FIG. 10(g), in the electrode structural unit 210, the third driving electrode 212 on the left side, the third driving electrode 212 on the right side and six sub-sensing electrodes therebetween form six capacitors. As stated above, each third driving electrode 212 "traverses" the (sub) sensing electrodes R1, R2 and R3 once.

Referring back to FIG. 9, in the touch input device 200, the at least one electrode structural unit 210 is arranged successively in the row direction to form an electrode array on the substrate 201. It is to be understood that the electrode structural unit 210 in the touch input device 200 may be any one of the electrode structural units 210 shown in FIGS. 10(a) to 10(g), and the electrode structural units 210 shown in FIGS. 10(a) to 10(g) are only illustrative rather than restrictive. For example, it is also possible to use five or even more groups of sensing electrodes in the electrode structural unit 210.

Figure 11:
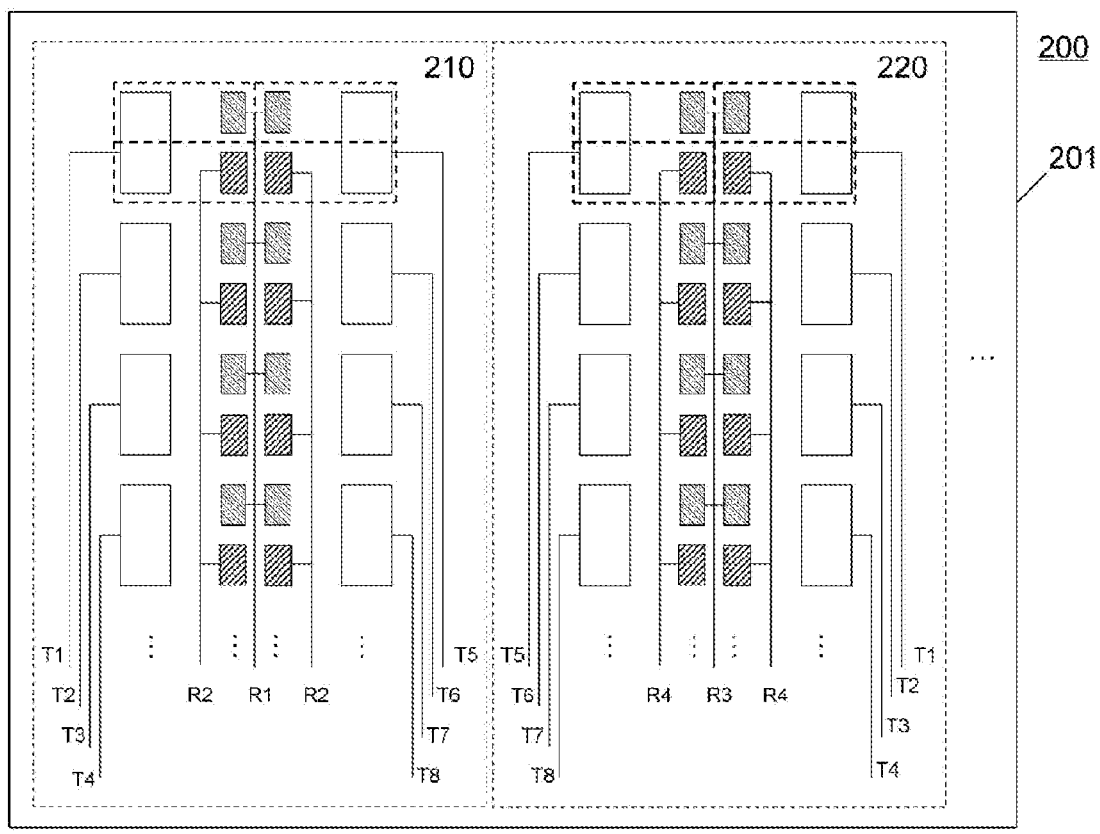
FIG. 11 schematically illustrates a variation of the touch input device shown in FIG. 9.

FIG. 11 schematically illustrates a variation of the touch input device 200 shown in FIG. 9. The touch input device 200 comprises at least one electrode structural unit 210 and at least one electrode structural unit 220 in a single layer on a substrate 201. As shown in the figure, the electrode structural unit 220 is identical with the electrode structural unit 210, except that in the electrode structural unit 220 the driving signal leads to which the third column of driving electrodes is connected and the ones to which the fourth column of driving electrodes is connected are interchanged. In the touch input device 200, the at least one electrode structural unit 210 and the at least one electrode structural unit 220 are arranged alternately in the row direction to form an electrode array. As known to those skilled in the art, the driving electrodes located at corresponding positions in respective electrode structural units 210 are connected to the same driving signal, the driving electrodes located at corresponding positions in respective electrode structural units 220 are connected to the same driving signal, and the sensing electrodes in respective electrode structural units 210 and respective electrode structural units 220 are connected to respective different sensing signals.

Figure 12:
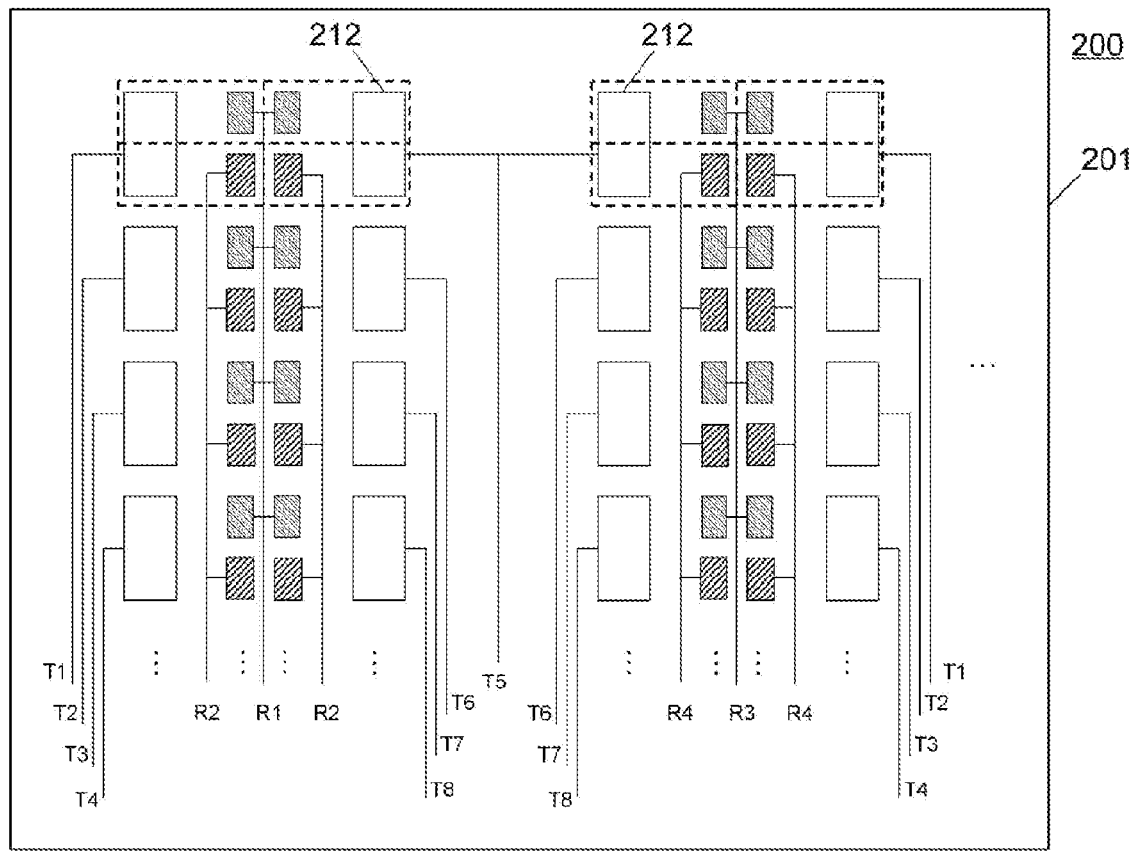
FIG. 12 schematically illustrates a variation of the touch input device shown in FIG. 11.

FIG. 12 schematically illustrates a variation of the touch input device 200 shown in FIG. 11, in which the last pair of third driving electrodes 212 between adjacent electrode structural units 210 and 220 in a direction opposite to a direction in which the diving signal leads T1, T2, T3 . . . T8 extend shares the same driving signal lead. In this way, as compared with the example shown in FIG. 11, one driving signal lead can be reduced between adjacent electrode structural units 210 and 220.

Figure 13:
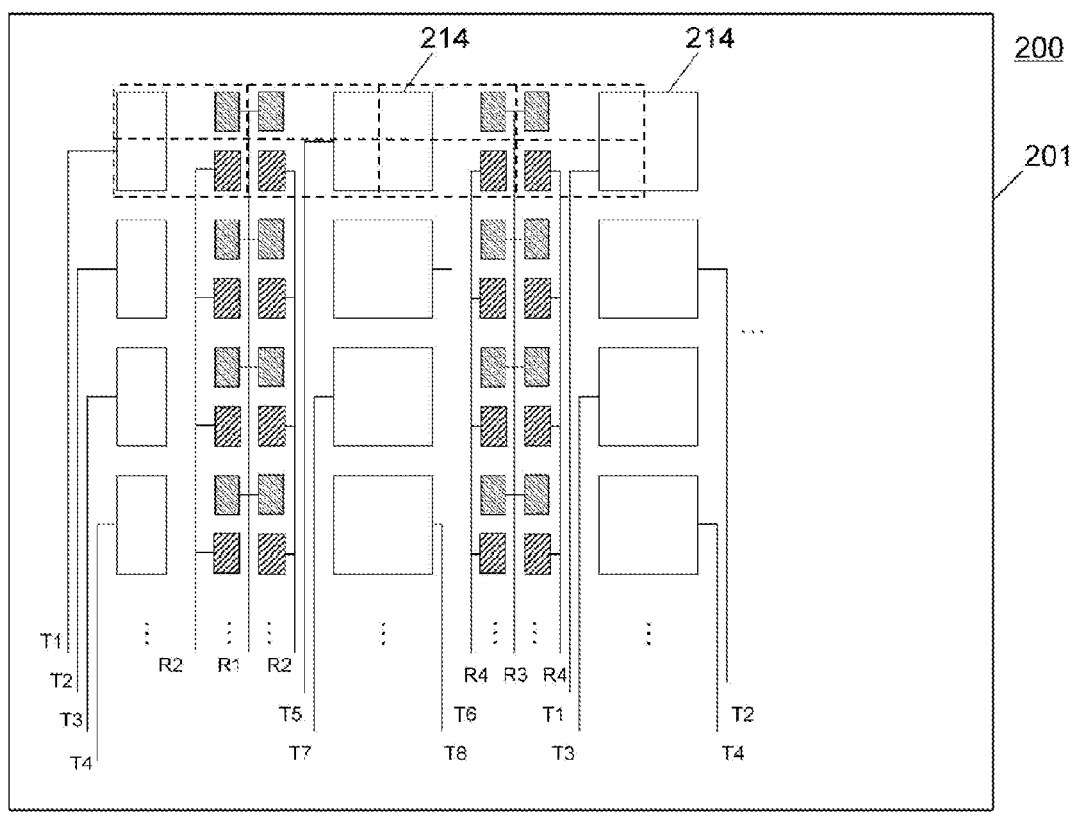
FIG. 13 schematically illustrates another variation of the touch input device shown in FIG. 11.

FIG. 13 schematically illustrates another variation of the touch input device 200 shown in FIG. 11, in which each pair of adjacent third driving electrodes 212 between adjacent electrode structural units 210 and 220 in the row direction is merged into one complete fourth driving electrode 214. In this way, as compared to the example shown in FIG. 11, four driving signal leads can be reduced between adjacent electrode structural units 210 and 220. The fourth driving electrode 214 may have an area two times larger than that of the third driving electrode 212, such that the capacitors formed between the sensing electrodes and the driving electrodes have substantially equal capacitance in the entire electrode array formed by the at least one electrode structural unit 210 and the at least one electrode structural unit 220, thereby creating substantially uniformly distributed touch sensitivity.

It is to be understood that in the touch input devices 200 shown in FIGS. 11, 12 and 13, the sensing electrodes in the electrode structural units 210 and 220 may be arranged in any of the sensing electrode arrangements shown in FIGS. 10(a) to 10(g), and the sensing electrode arrangements shown in FIGS. 10(a) to 10(g) are only illustrative rather than restrictive.

In accordance with another aspect of the present disclosure, a touch display device is proposed which comprises any of the touch input devices described in the above embodiments. In addition to the touch input device, the touch display device comprises other components such as a display screen, which is well known in the art and will not be discussed here in detail.

While several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A touch input device comprising at least one first electrode structural unit formed on a first surface of a substrate, the first electrode structural unit comprising:
    a first column of driving electrodes comprising at least one first driving electrode;
    a sensing electrode extending in a column direction; and
    a second column of driving electrodes comprising at least one first driving electrode, and
    at least one second electrode structural unit formed on the first surface of the substrate, the second electrode structural unit being identical with the first electrode structural unit except that in the second electrode structural unit the driving signal leads to which the first column of driving electrodes is connected and the ones to which the second column of driving electrodes is connected are interchanged,
    wherein the first column of driving electrodes, the sensing electrode and the second column of driving electrodes are arranged successively in a row direction, wherein each of the first driving electrodes is connected to a different driving signal lead, and the sensing electrode is connected to a sensing signal lead, and
    wherein each of the first driving electrodes and a corresponding portion of the sensing electrode form a capacitor, and
    wherein the at least one first electrode structural unit and the at least one second electrode structural unit are arranged alternately in the row direction to form an electrode array, the driving electrodes located at corresponding positions in respective first electrode structural units are connected to the same driving signal, the driving electrodes located at corresponding positions in respective second electrode structural units are connected to the same driving signal, and the sensing electrodes in respective first electrode structural units and respective second electrode structural units are connected to respective different sensing signals.

2. The touch input device according to claim 1, wherein the capacitors formed by respective first driving electrodes and the corresponding portions of the sensing electrode have substantially equal capacitance.

3. The touch input device according to claim 1, wherein the at least one first electrode structural unit is arranged successively in the row direction to form an electrode array, the driving electrodes located at corresponding positions in respective first electrode structural units are connected to the same driving signal, and the sensing electrodes in respective first electrode structural units are connected to respective different sensing signals.

4. The touch input device according to claim 1, wherein, between the first electrode structural unit and the second electrode structural unit that are adjacent to each other, the last pair of the first driving electrodes in a direction opposite to a direction in which the driving signal leads extend shares the same driving signal lead.

5. The touch input device according to claim 1, wherein, between the first electrode structural unit and the second electrode structural unit that are adjacent to each other, each pair of adjacent first driving electrodes in the row direction is merged into a complete second driving electrode.

6. The touch input device according to claim 5, wherein the second driving electrode has an area two times larger than that of the first driving electrode.

7. A touch display device comprising the touch input device according to claim 1.

8. A touch input device comprising at least one third electrode structural unit formed on a first surface of a substrate, the third electrode structural unit comprising:
    a third column of driving electrodes comprising at least one third driving electrode;
    a column of sensing electrodes comprising at least two groups of sensing electrodes, each group comprising at least one sensing electrode; and
    a fourth column of driving electrodes comprising at least one third driving electrode, wherein the third column of driving electrodes, the one column of sensing electrodes and the fourth column of driving electrodes are arranged successively in a row direction, each of the third driving electrodes is connected to a different driving signal lead, and the same group of sensing electrodes in the at least two groups of sensing electrodes is connected to the same sensing signal lead while different groups of sensing electrodes are connected to different sensing signal leads, and wherein a portion of each of the column of sensing electrodes and a portion of a corresponding one of the third column of driving electrodes form a capacitor, another portion of each of the column of sensing electrodes and a portion of a corresponding one of the fourth column of driving electrodes form a capacitor, and the at least two groups of sensing electrodes are such arranged in a column direction that each of the third driving electrodes forms a capacitor with a portion of only one sensing electrode in each group of the at least two groups of sensing electrodes.

9. The touch input device according to claim 8, the capacitors formed by the portions of respective sensing electrodes and the portions of corresponding third driving electrodes have substantially equal capacitance.

10. The touch input device according to claim 8, wherein the column of sensing electrodes comprises two types of sub-columns arranged alternately in the column direction, wherein each sub-column consists of one sensing electrode in each group of sensing electrodes, the sensing electrodes in a first type of sub-columns are arranged in a first order, and the sensing electrodes in a second type of sub-columns are arranged in a second order reverse to the first order.

11. The touch input device according to claim 10, wherein two sensing electrodes which are adjacent in the column direction and belong to the same group are merged into a complete electrode.

12. The touch input device according to claim 8, wherein each sensing electrode in the column of sensing electrodes comprises a first sub-sensing electrode and a second sub-sensing electrode adjacent in the row direction, wherein the first sub-sensing electrode corresponds to the portion of the sensing electrode which forms a capacitor with a portion of a corresponding third driving electrode in the third column of driving electrodes, and the second sub-sensing electrode corresponds to the portion of the sensing electrode which forms a capacitor with a portion of a corresponding third driving electrode in the fourth column of driving electrodes.

13. The touch input device according to claim 12, wherein the column of sensing electrodes comprises two types of sub-columns arranged alternately in a column direction, wherein each sub-column consists of one sensing electrode in each group of sensing electrodes, the sensing electrodes in a first type of sub-columns are arranged in a first order, and the sensing electrodes in a second type of sub-columns are arranged in a second order reverse to the first order.

14. The touch input device according to claim 13, wherein two first sub-sensing electrodes or second sub-sensing electrodes which are adjacent in the column direction and belong to the same group are merged into a complete electrode.

15. The touch input device according to claim 8, wherein the at least one third electrode structural unit is arranged successively in the row direction to form an electrode array, the driving electrodes located at corresponding positions in respective third electrode structural units are connected to the same driving signal, and the groups of sensing electrodes in respective third electrode structural units are connected to respective different sensing signals.

16. The touch input device according to claim 8, further comprising at least one fourth electrode structural unit formed on the first surface of the substrate, the fourth electrode structural unit being identical with the third electrode structural unit except that the driving signal leads to which the third column of driving electrodes is connected and the ones to which the fourth column of driving electrodes is connected are interchanged, wherein the at least one third electrode structural unit and the at least one fourth electrode structural unit are arranged alternately in the row direction to form an electrode array, the driving electrodes located at corresponding positions in respective third electrode structural units are connected to the same driving signal, the driving electrodes located at corresponding positions in respective fourth electrode structural units are connected to the same driving signal, and the groups of sensing electrodes in respective third electrode structural units and respective fourth electrode structural units are connected to respective different sensing signals.

17. The touch input device according to claim 16, wherein, between the third electrode structural unit and the fourth electrode structural unit that are adjacent to each other, the last pair of third driving electrodes in a direction opposite to a direction in which the driving signal leads extend shares the same driving signal lead.

18. The touch input device according to claim 16, wherein, between the third electrode structural unit and the fourth electrode structural unit that are adjacent to each other, each pair of adjacent third driving electrodes is merged into a complete fourth driving electrode.

19. The touch input device according to claim 18, wherein the fourth driving electrode has an area two times larger than that of the third driving electrode.

* * * * *